US006529816B1

(12) United States Patent
Yamaguchi et al.

(10) Patent No.: US 6,529,816 B1
(45) Date of Patent: Mar. 4, 2003

(54) EVOLUTIONARY CONTROLLING SYSTEM FOR MOTOR

(75) Inventors: Masashi Yamaguchi, Shizuoka (JP); Ichikai Kamihira, Shizuoka (JP); Hiroaki Takechi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/370,285

(22) Filed: Aug. 9, 1999

(30) Foreign Application Priority Data

Aug. 7, 1998 (JP) .......................................... 10-224864

(51) Int. Cl.[7] .......................... F02D 41/26; G06F 15/18

(52) U.S. Cl. ......................... 701/110; 701/115; 700/48; 706/13

(58) Field of Search ........................... 701/22, 110, 115; 700/47, 48; 706/13; 123/350, 396, 399; 318/600

(56) References Cited

U.S. PATENT DOCUMENTS

| | | | | |
|---|---|---|---|---|
| 5,477,825 A | | 12/1995 | Hattori et al. | 123/399 |
| 5,532,929 A | | 7/1996 | Hattori et al. | 701/110 |
| 5,611,310 A | | 3/1997 | Kuroda et al. | 123/399 |
| 5,971,579 A | * | 10/1999 | Kim | 700/42 |
| 6,021,369 A | * | 2/2000 | Kamihira et al. | 701/102 |
| 6,032,139 A | | 2/2000 | Yamaguchi et al. | 706/13 |
| 6,278,986 B1 | * | 8/2001 | Kamihira et al. | 706/25 |
| 6,314,412 B1 | | 11/2001 | Yamaguchi et al. | 706/13 |

FOREIGN PATENT DOCUMENTS

| | | | |
|---|---|---|---|
| FR | 2 720 699 | | 12/1995 |
| JP | 10-154003 | * | 6/1998 |

OTHER PUBLICATIONS

Raed Abu Zitar, et al., Neurocontrollers Trained with Rules Extracted by Genetic Assisted Reinforcement Learning System, 8357 IEEE, Transactions on Neural Networks 6(1995) Jul., No. 4, pp 859–879.

* cited by examiner

*Primary Examiner*—Andrew M. Dolinar
(74) *Attorney, Agent, or Firm*—Knobbe Martens Olson & Bear LLP

(57) ABSTRACT

In an output controlling method for controlling output of a driving power source or motor installed in a vehicle, the relationship between a primary output-controller, which is manipulated by the user, and a secondary output-controller, which directly operates the motor, is regulated by control parameter subjected to evolution by using evolutionary computing based on at least one of the following: the user's characteristics, driving conditions, environmental changes, and deterioration of the drive power source with time. The evolution is conducted on-line or on a real-time basis. The primary output-controller includes an acceleration pedal or grip, and the secondary output-controller includes a throttle valve for an internal combustion engine or a running current controller for an electric motor.

15 Claims, 21 Drawing Sheets x1: throttle input
x2: virtual throttle input
y: throttle valve angle
f: static characteristic function
T: first order lag time constant
Td: differential time
α: acceleration compensation factor
η: differential gain

EVOLUTIONARY CONTROLLING SYSTEM FOR MOTOR

BACKGROUND OF THE INVENTION

1. Field of the Invention

This invention relates to an evolutionary controlling system for motors, and particularly to that for controlling, in an evolutionary manner, output of motors installed in vehicles, for example.

2. Description of Related Art

Vehicles equipped with driving power such as combustion engines or electric motors are provided with primary output-controllers such as accelerator pedals, accelerator levers, or accelerator grips, so that a user can control output of the driving power by using the primary output-controller to directly operate a secondary output-controller such as throttle valves or current-carrying controllers for electric motors, thereby ultimately controlling output of the drive power.

In the above, the operational movement of the primary output-controller and the operational movement of the secondary output-controller are fixed in a pre-set relationship before shipping the vehicle. Thus, for example, when the accelerator grip is manipulated to a certain angle, the throttle valve is basically synchronized with the accelerator grip, and the opening of the throttle valve is always constant for the same angle of the accelerator grip. Similarly, the movement of the throttle grip is always constant for the same movement of the accelerator lever.

The relationship between the operational movement of the primary output-controller and the operational movement of the secondary output-controller directly represents output characteristics of the vehicles equipped with driving power or motors which include combustion engines and electric motors. For example, the larger the opening of the throttle per angle of the accelerator grip, the greater the output becomes; that is, this is a power-focused type. On the other hand, the smaller the opening of the throttle per angle of the accelerator grip, the lower the output becomes; that is, this is a fuel efficiency-focused type. Similarly, the greater the movement of the throttle valve per movement of the accelerator grip, the quicker the response becomes; that is, this is a response-focused type. On the other hand, the less the movement of the throttle valve per movement of the accelerator grip, the less the fluctuation of output becomes; that is, this is a comfort-focused type.

Because preferences over the above output characteristics differ depending on the individual user, the user may not be satisfied if the relationship between the primary output-controller and the secondary output-controller is pre-fixed prior to shipment.

Further, in addition to the above problem, vehicles with driving power are used under various environmental conditions, and the conditions of the vehicles themselves differ greatly depending on the users. Furthermore, driving power sources including peripheral parts deteriorate with time. Thus, the relationship between the primary output-controller and the secondary output-controller may not remain optimum.

SUMMARY OF THE INVENTION

An objective of the present invention in an embodiment is to provide a control method for vehicles equipped with driving power to change and adapt the relationship between the primary output-controller and the secondary output-controller to the user's characteristics (such as preferences, skill, and conditions), driving conditions, environmental changes, and/or deterioration of driving power and peripheral parts with time.

The objective can be achieved by embodiments of the present invention as follows:

In an output controlling method for controlling output of a driving power source installed in a vehicle wherein the operational movement of a secondary output-controller directly controlling output of the drive power source is determined based on the operational movement of a primary output-controller which a user can manipulate, the relationship between the primary output-controller and the secondary output-controller evolves by using evolutionary computing including generic algorithms and genetic programming based on at least one of the following: the user's characteristics, driving conditions, environmental changes, and deterioration of the drive power source with time.

The present invention can be applied not only to a system but also to a method. An appropriate method can be performed accordingly. In addition, although the present invention can advantageously and preferably be applied to an internal combustion engine and an electric motor, it can be applied to other motors as described later.

BRIEF DESCRIPTION OF THE DRAWINGS

These and other features of the invention will now be described with reference to the drawings of a preferred embodiment which is intended to illustrate and not to limit the invention, and in which:

FIG. 4(*a*) shows an embodiment of a small-angle rapid-acceleration type.

FIG. 4(*b*) shows an embodiment a proportion type.

FIG. 4(*c*) shows an embodiment a large-angle rapid-acceleration type.

FIG. 17(*a*) shows an embodiment of a small-angle rapid-acceleration type.

FIG. 17(*b*) shows an embodiment a proportion type.

FIG. 17(*c*) shows an embodiment a large-angle rapid-acceleration type.

DETAILED DESCRIPTION OF THE PREFERRED EMBODIMENTS OF THE INVENTION

The output control system for vehicles equipped with drive power sources according to the present invention will be explained with reference to several embodiments indicated in the figures.

Basic Structures of Output Control System

Figure 1A:
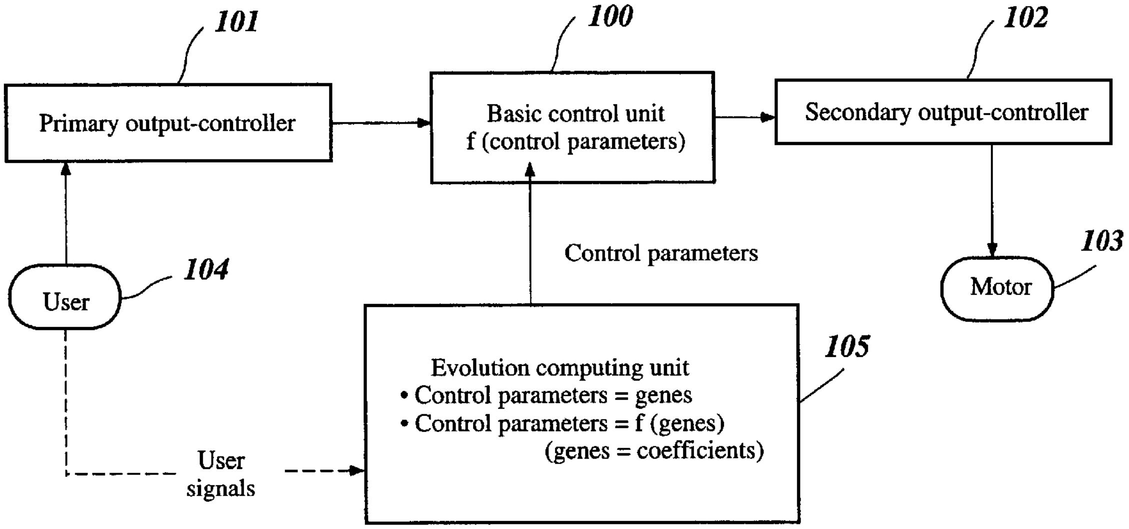
FIG. 1*a* is a schematic diagram showing an embodiment of the output control system according to the present invention.

As shown in FIG. 1*a,* a system according to the present invention is for controlling performance of a motor 103 used by a user 104, which performance is controlled by a primary output-controller 101 manipulated by the user 104 and a secondary output-controller 102 directly operating the motor 103 based on the manipulated movement of the primary output-controller 101. The system comprises: (i) a basic control unit 100 for regulating the relationship between manipulated movement of the primary output-controller 101 and operated movement of the secondary output-controller 102, said relationship being regulated by control parameters; and (ii) an evolutionary computing unit 105 programmed to output control parameters to the basic control unit by selecting on a real-time basis fitted values of the control parameters based on a pre-selected signal used as standards for selecting the values of the control parameters; while operating the motor 103, wherein the values of the control parameters of the basic control unit are replaced with the fitted values of the control parameters to update the input-output relationship of the basic control unit.

In an embodiment of the evolutionary computing unit, the values of the control parameters are used as genes. In another embodiment of the evolutionary computing unit, the control parameters are regulated by coefficients which are used as genes. In the latter, the fitted values of control parameters are derived by on-line selecting fitted coefficients by evolutionary computing programmed to select on a real-time basis the fitted coefficients.

If the values of the control parameters are used as genes, values of each control parameter are pre-selected in a pre-selected range to encode an individual (chromosome). Each individual (chromosome) can contain genes of plural control parameters, each having the pre-selected values. By limiting the range of the pre-selected values, it is possible to avoid formation of an individual having characteristics which causes a malfunction of the motor. This embodiment can simplify the structure of the evolutionary computing unit. For example, a control parameter outputting unit 107 (explained later) of FIG. 1*b* need not be included.

If the control parameters are regulated by coefficients, the coefficients are used as genes. The relationship between the control parameters and the coefficients may be predetermined. As in the embodiment wherein the control parameters are used as genes, the coefficients can be used as genes to determine the control parameters.

Figure 6:
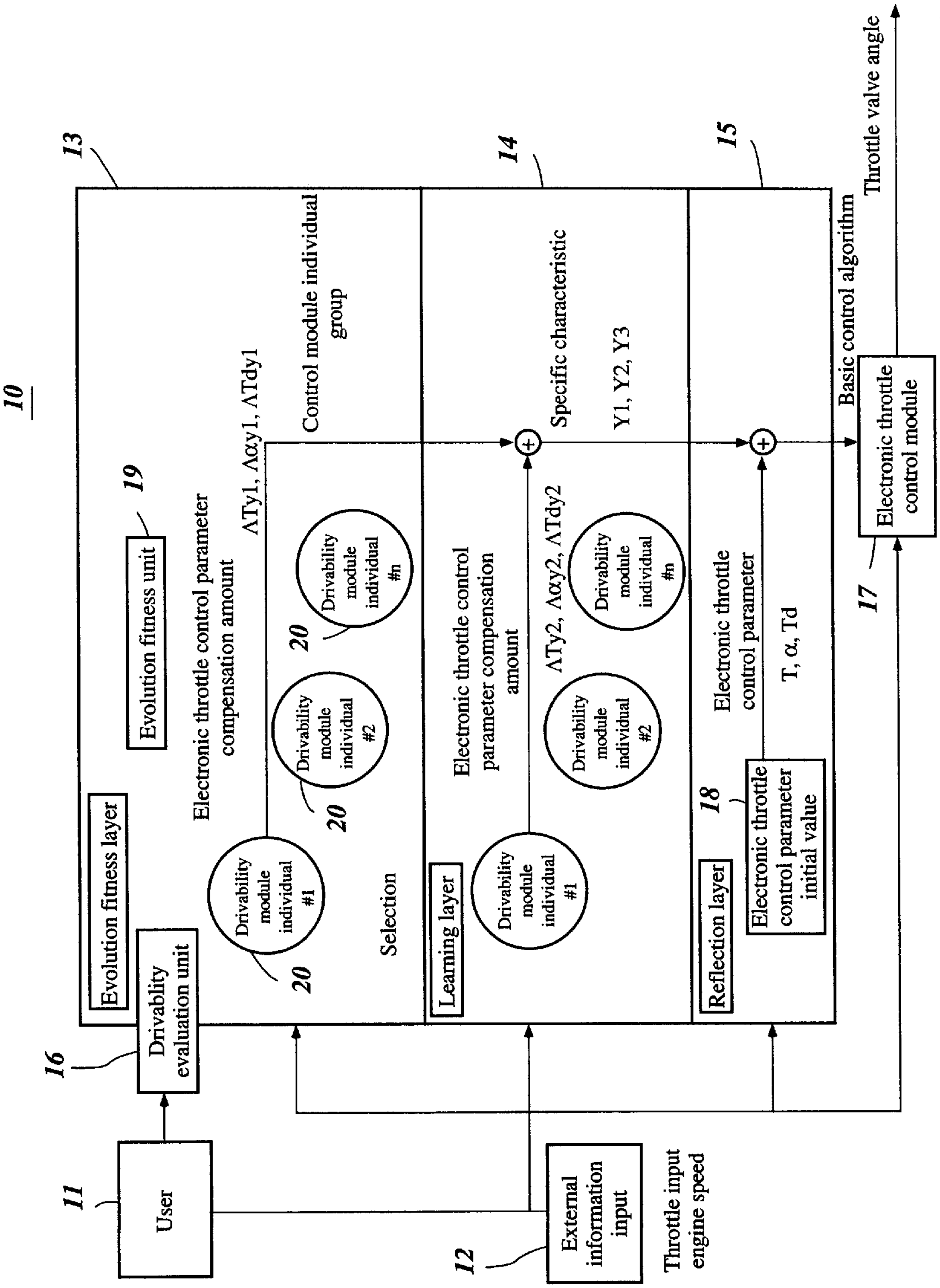
FIG. 6 is a block diagram showing an embodiment of the evolution control unit.
Figure 8:
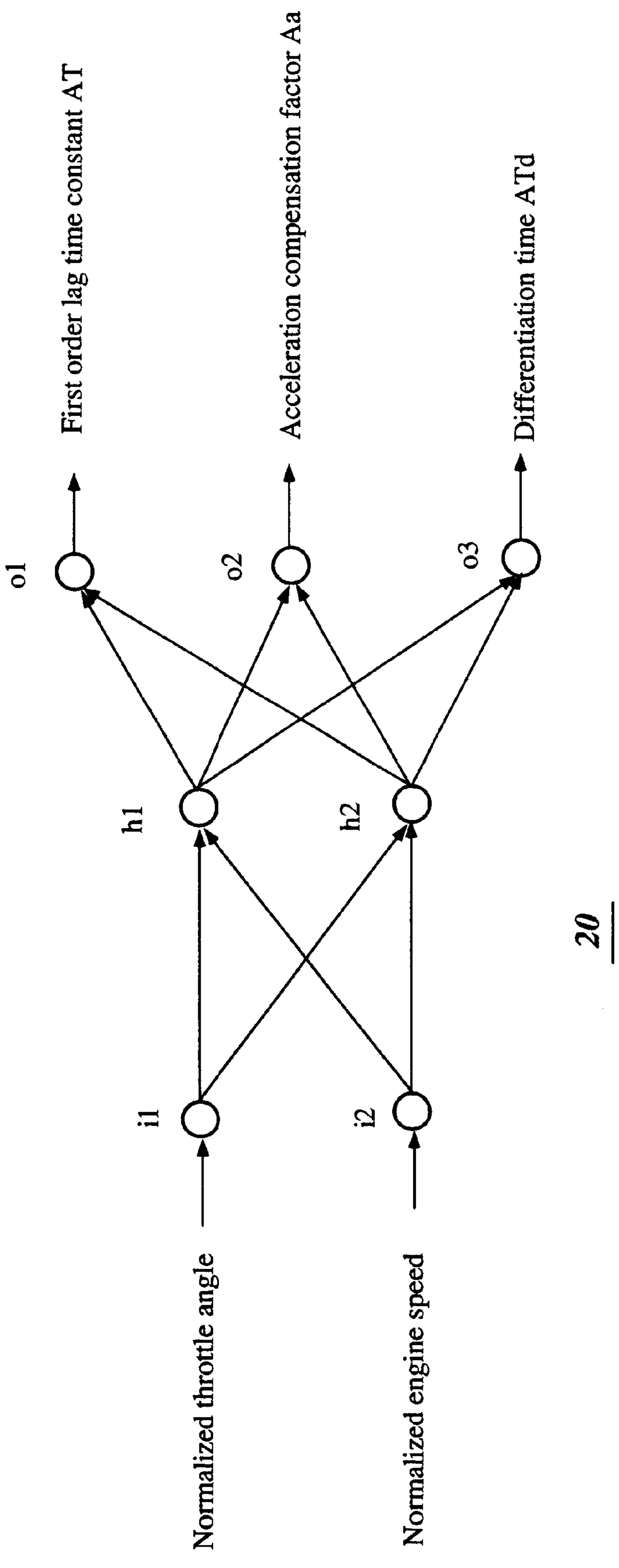
FIG. 8 shows an embodiment of the control module at the evolution fitness layer.

If indicative signals indicating performance of the motor are required or preferable to determine the control parameters, the indicative signals are inputted into the evolutionary computing unit 105. If indicative signals indicating performance of the motor are required or preferable to determine the output of the secondary output-controller 102, the indicative signals are inputted into the basic control unit 100 or the secondary output-controller 102 itself. However, as shown in FIG. 1*a,* indicative signals are not essential to evolution processes. In FIGS. 6 and 8 (internal combustion engine) and FIG. 20 (electric motor), which will be explained later, indicative signals are used to determine control parameters, and thus, the indicative signals are inputted into the evolutionary computing unit. However, to determine engine torque of an internal combustion engine, indicative signals are not indispensable, and the indicative signal input can be omitted from these figures. That is, no feedback is required. In an embodiment shown in FIG. 1*b,* the performance of the motor is indicated by indicative signals, and the evolutionary computing unit 105 is comprised of a control parameter outputting unit 107 and an evolutionary computing subunit 106. The control parameter outputting unit 107 is programmed to output the control parameters when receiving indicative signals indicating the performance of the motor 103, wherein the input-output relationship of the control parameter outputting unit is regulated by coefficients. The evolutionary computing subunit 106 is programmed to on-line select and output fitted coefficients by the evolutionary computing, wherein the coefficients used in the control parameter outputting unit 107 are replaced with the fitted coefficients to update the input-output relationship of the control parameter outputting unit 107. In an embodiment, the control parameter outputting unit comprises a neural network regulated by coupling coefficients. If the neural network is used in coding of genes, well controlled output can be generated by using relatively small numbers of genes.

In an embodiment, the system further comprises an evaluation unit 108 programmed to generate selection signals for selecting the fitted values of the control parameters and to output the signals to the evolutionary computing unit 105, when receiving signals from the user 104 in real-time response to the performance of the motor 103. In an embodiment, the user is not required to specify his or her preference but is required to on-line respond to the performance of the motor 103. Accordingly, the motor performance can evolve in accordance with the user without the user's consciousness.

Figure 1B:
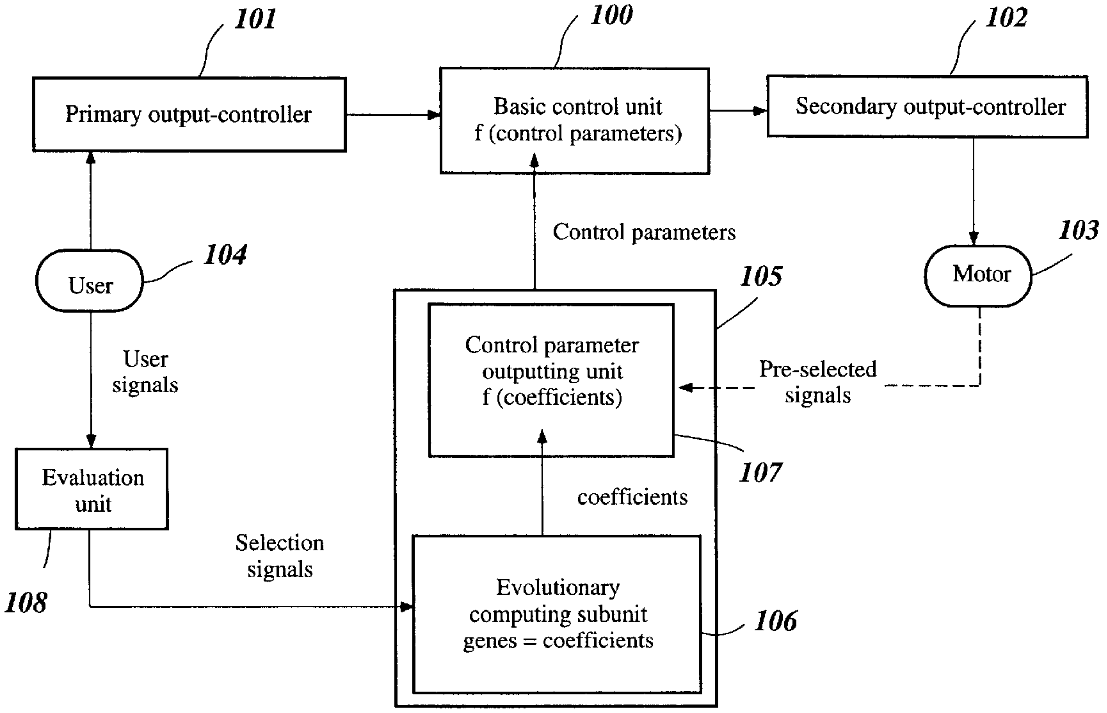
FIG. 1*b* is a schematic diagram showing another embodiment of the output control system according to the present invention.

In FIGS. 1*a* and 1*b*, the control system comprises the basic control unit 100 and the evolutionary computing unit 105, and hereinafter the control system may be referred to simply as "control unit" or "evolution control unit". The term "control unit" includes "evolution control unit" and may have an element added to the evolution control unit. In FIG. 1*a* or 1*b*, the basic control unit 100 and the evolutionary computing unit 105 (further the control parameter outputting unit 107 and the evolutionary computing subunit 106) are separately indicated based on their functions, but these structures may be conceptual or virtual and may be different from actual or physical structures.

Figure 20:
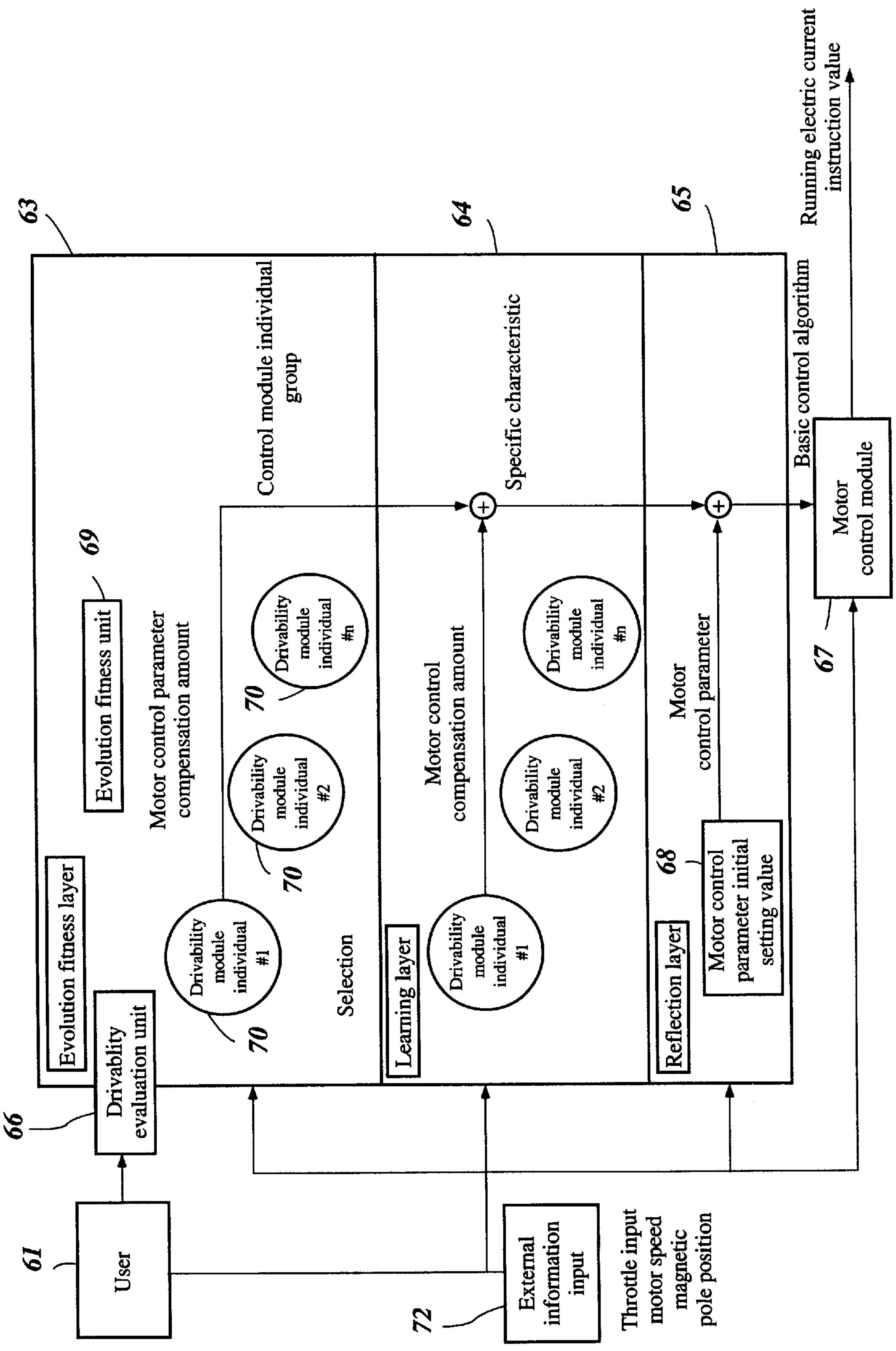
FIG. 20 is a block diagram showing an embodiment of the evolution control unit.

FIGS. 6 and 20 (explained later) show another embodiment. In FIG. 6, the evolutionary computing unit 105 of FIG. 1*a* or the control parameter outputting unit 107 and the evolutionary computing subunit 106 of FIG. 1*b* are comprised of plural layers. The plural layers simply indicate the functional concepts included in the system and need not be installed as separate parts. In this embodiment, a reflection layer 15 is provided parallel to an evolution fitness layer 13 and upstream of an electric throttle control module 17. Further, a learning layer 14 is provided parallel to the evolution fitness layer 13 and upstream of the reflection layer 15. However, neither the learning layer 14 nor the reflection layer 15 is indispensable as explained below. Comparing FIGS. 1 and 6, the basic control unit 100 of FIG. 1 corresponds to the electronic throttle control module 17, the control parameter outputting unit 106 corresponds to a drivability module 20, and the evolutionary computing subunit 106 corresponds to an evolution fitness unit 19. In FIG. 6, plural drivability modules 20 are separately indicated merely for easy understanding. The drivability module 20 may be composed of a single structure as indicated in FIG. 1 (the control parameter outputting unit 107), and many individuals can be created in a computer, and be subjected to selection by using an evolutionary computing technique programmed in the evolutionary computing subunit 106.

The reflection layer 15 is for outputting a base value of control parameters to regulate the relationship between the manipulated movement of the primary output-controller and the operated movement of the secondary output-controller, but the reflection layer 15 is not indispensable if the evolution fitness layer 13 (or the control parameter outputting unit 105 and the evolutionary computing subunit 106) is programmed to output a base value, i.e., if the evolution fitness layer 13 is designed to output a value within a certain range (e.g., a minimum value or base value is given). The reflection layer 15 is advantageous basically in preventing surges of the output and stabilizing the performance, but its function can be incorporated into the evolution fitness layer 13. The reflection layer 15 can be a conventional control module which constantly outputs signals based on calculation.

In anther embodiment, also as shown in FIGS. 6 and 20, the evolution control unit 10 further comprises the learning layer 14 between the evolution fitness layer 13 and the reflection layer 15, said learning layer 14 having a learning function which copies the input-output relationship of the evolution fitness layer 13. In the above, the learning layer 14 can be constituted by, for example, neural networks. The learning layer 14 is not indispensable if the evolution fitness layer 13 (or the control parameter outputting unit 107 and the evolutionary computing subunit 106) is programmed to modify the initial values to those of the previously evolved individuals whenever the evolution fitness layer 13 is newly activated. That is, if the evolution fitness layer 13 is designed so that the initial individuals are coded by the genes of the previously selected individuals, the learning layer 14 need not be installed separately.

In another embodiment, the user's direct selection is conducted by using an indication monitor which indicates the performance of the motor, wherein the user selects preferable performance indicated on the monitor. Further, in another embodiment, the user reaction is analyzed based on a change in operational action by the user in a pre-set time period.

Output Control System Applied to Internal Combustion Engine

FIGS. 2–13 show en embodiment of the output control system for vehicles equipped with drive power sources according to the present invention (hereinafter referred to as "output control system") wherein the system is adapted to an internal combustion engine 2 including an electronic throttle.

Figure 2:
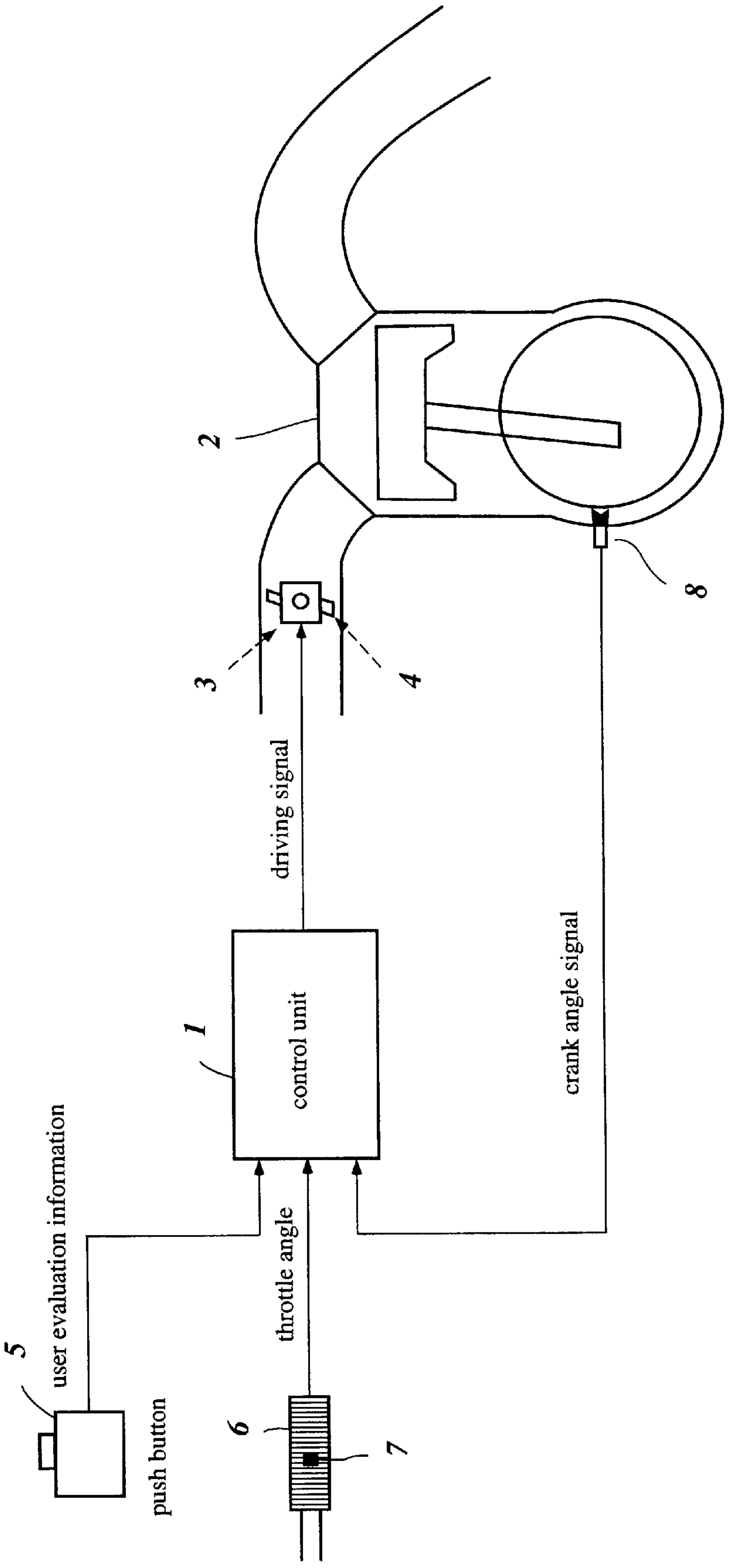
FIG. 2 is a schematic view showing an embodiment of the relationship between an engine and a control unit carrying out output control.

FIG. 2 is a schematic view showing the relationship between the engine 2 and the control unit 1 carrying out output control.

The engine 2 indicated in this figure includes an electronic throttle wherein the opening of a throttle valve 4 is controlled by a stepping motor 3 which is driven in accordance with an operational movement of an accelerator detected by a detection sensor 7 based on an operational movement of an accelerator grip 6 used by a user. The control unit 1 receives a crank angle signal from a crank angle sensor provided in the engine 2, and the accelerator operational movement signal from the operational movement sensor 7 generated by the accelerator grip 6. The control unit 1 determines and outputs the stepping motor driving signal based on the above input information.

Figure 3:
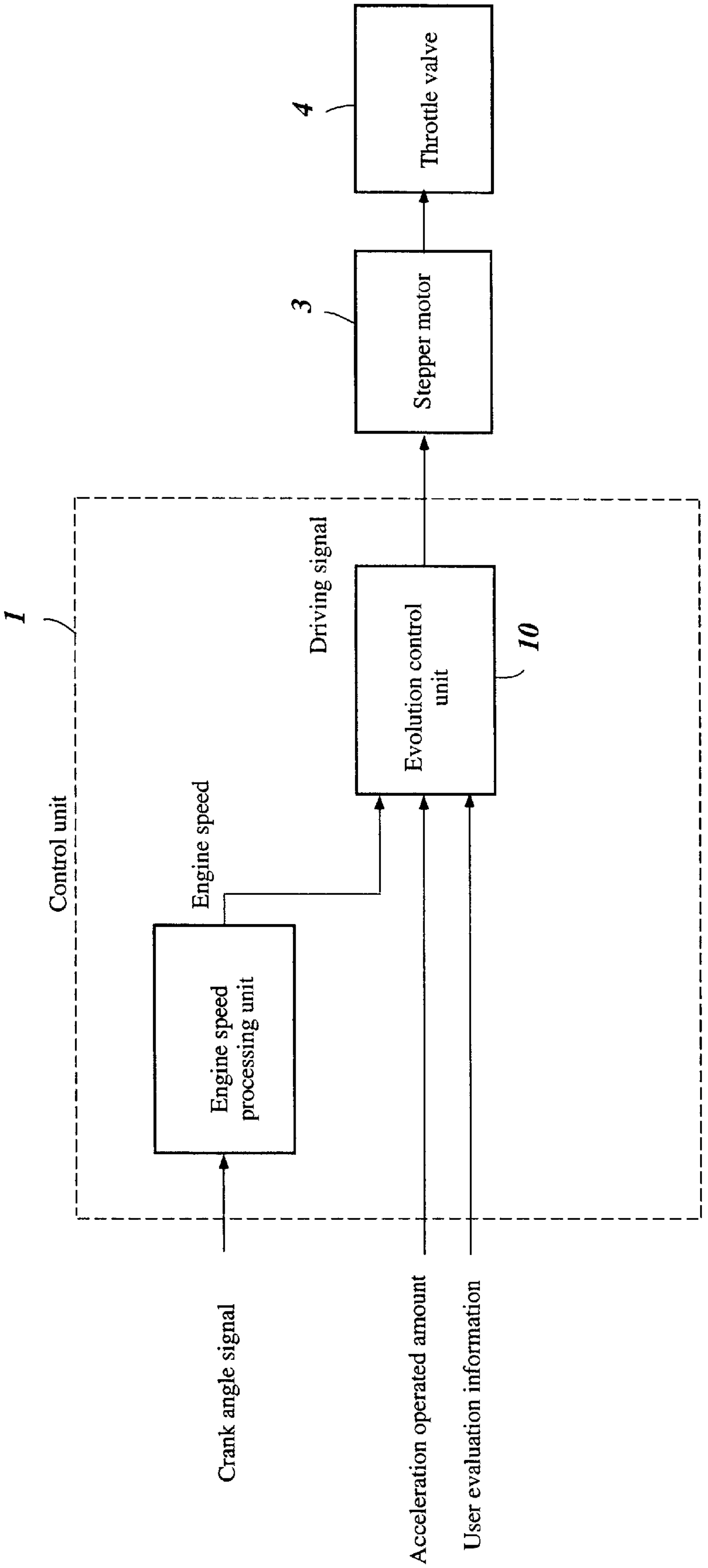
FIG. 3 is a block diagram schematically showing an embodiment of internal structures of the control unit.

FIG. 3 is a block diagram schematically showing the internal structures of the control unit 1. As shown in FIG. 3, the control unit 1 comprises an engine speed processing unit 9 and an evolution control unit 10, and the engine speed processing unit 9 determines the engine revolutions based on the crank angle signal.

The evolution control unit 10 receives the engine revolution signal determined at the engine speed processing unit 9 and the accelerator operational movement signal, and determines and outputs the stepping motor driving signal based on the above input information.

Further, as shown in FIGS. 2 and 3, the evolution control unit 10 of the control unit 1 receives user evaluation information via an evaluation input device 5 of a push-button type. Based on the user evaluation information, the evolution control unit 10 evolutionarily changes the relationship between the above input information and the output information, i.e., evolutionarily changes the driving characteristics of the throttle valve in response to the accelerator operational movement by the user. These structures allow the output characteristics of the vehicle equipped with the engine 2 to be adapted to the preferences of the user.

The characteristics of the electronic throttle valve 4 responsive to the accelerator operational movement can be classified into two driving characteristics, i.e., static characteristics and dynamic characteristics.

The static characteristics describe the relationship between the accelerator operational movement and the throttle valve angle when the accelerator operational movement (i.e., a manipulation angle of the accelerator grip) is constant. The static characteristics represent normal driving characteristics of the vehicle.

Figures 4A, 4B, 4C:
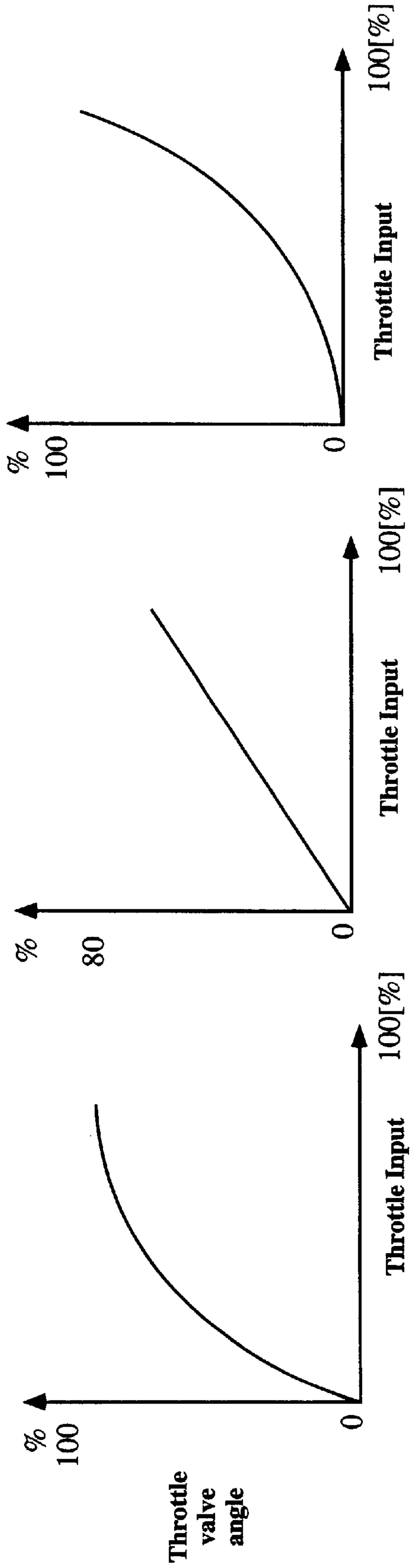
FIGS. 4(*a*), 4(*b*), and 4(*c*) show changing patterns of the static characteristics in response to the manipulated angle of the accelerator grip.

As described above, by changing the static characteristics, as shown in FIG. 4, when the manipulated angle of the accelerator grip is small, the electronic throttle valve opens widely. As the manipulated angle of the accelerator grip increases, the throttle valve gradually opens until the valve completely opens in a small-angle rapid-acceleration type (see FIG. 4(*a*)). The manipulated angle of the accelerator grip is proportional to the throttle angle in a proportion type (see FIG. 4(*b*)). When the manipulated angle of the accelerator grip is small, the throttle valve opens gradually, and when the manipulated angle of the accelerator grip is large, the throttle valve opens rapidly until the valve completely opens in a large-angle rapid-acceleration type (see FIG. 4(*c*)). As shown above, various throttle angles can be obtained at the same manipulated angle of the accelerator grip. These static characteristics can be in the form of any functions if the throttle angle increases or is constant in response to an increase in the accelerator operational movement and if the throttle opening is zero when the accelerator operational movement is zero. By changing the static characteristics, different signals of the throttle valve angle can be outputted in response to the same accelerator operational movement.

Figure 5:
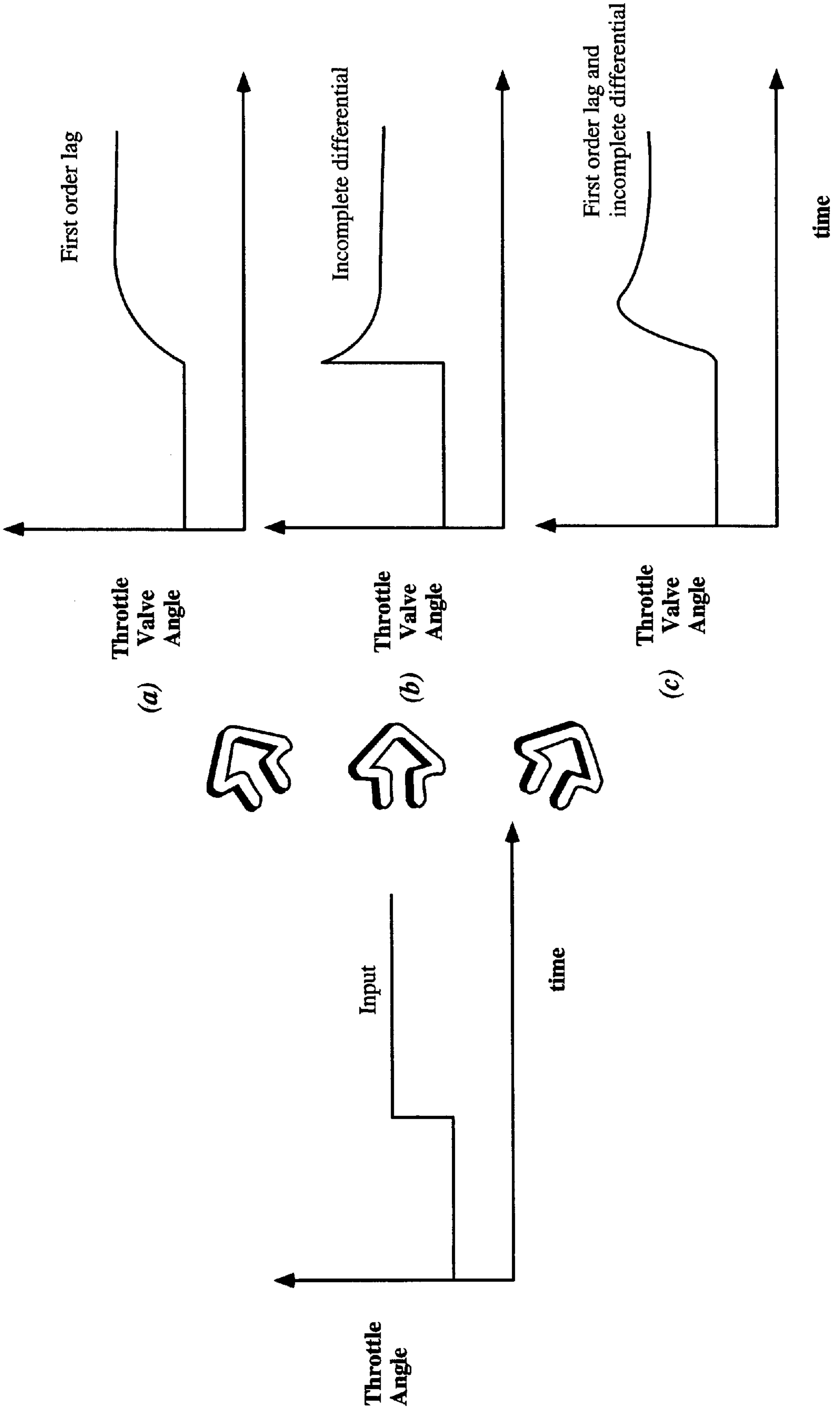
FIG. 5 shows various dynamic characteristics, and (a) shows an embodiment of a low-response type, (b) shows an embodiment of a high-response type, and (c) shows an embodiment of an intermediate type between the low-response type and the high-response type.

The dynamic characteristics represent the relationship between changes in the accelerator operational movement and changes in throttle angles, and are involved in transient characteristics of vehicles. In practice, the dynamic characteristics can be changed by adjusting a combination of a first-order lag filter and an incomplete differential filter, and by changing these parameters. By changing the dynamic characteristics, as shown in FIG. 5, various dynamic characteristics can be obtained: The throttle valve opens relatively slowly in response to accelerator operation in a low-response type (see FIG. 5(*a*)). The throttle valve opens very responsively although a slight spike appears in response to acceleration operation in a high-response type (see FIG. 5(*b*)). In an intermediate type, the response is half-way between the low-response type and the high-response type (see FIG. 5(*c*)).

The structure of the evolution control unit will be explained in detail below.

FIG. 6 is a block diagram showing an embodiment of the evolution control unit 10.

As shown in this figure, the evolution control unit 10 comprises a reflection layer 15, a learning layer 14, and an evolution fitness layer 13. The evolution control unit 10 further comprises the electronic throttle control module 17 and a drivability evaluation unit 16.

Throttle Control Module and Reflection Layer

The reflection layer 15 comprises an initial value setting unit 18 for electronic throttle control parameters. The electronic throttle control module 17 corresponds to the basic control unit 100 of FIG. 1. FIG. 6 simply indicates the functional concept of the control system, and, for example, the electronic throttle control module can be regarded as a part of the reflection layer 15 or can be regarded as an extension of the evolution fitness layer 13.

Figure 7:
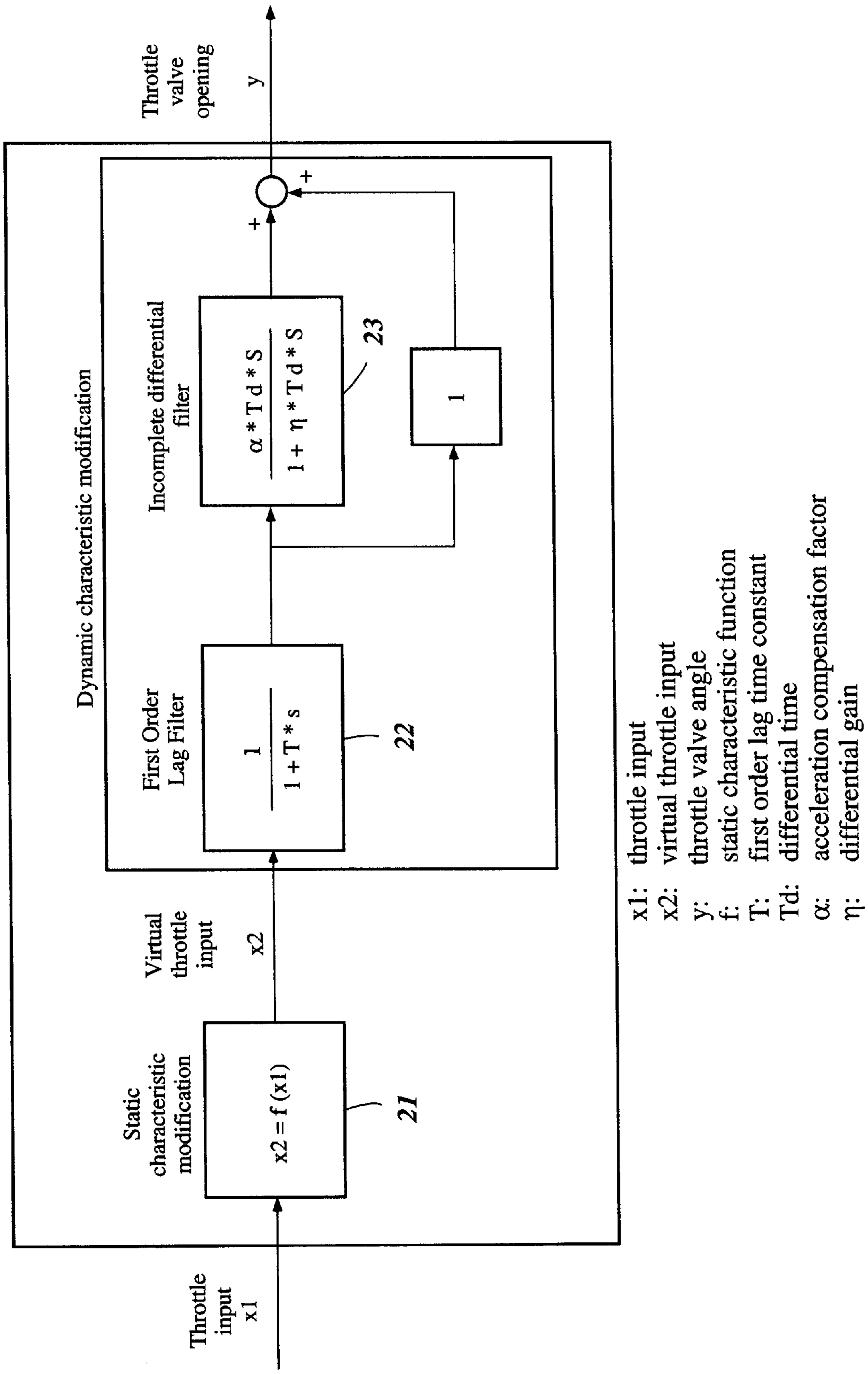
FIG. 7 is a block diagram showing an embodiment of the electronic throttle control module.

As shown in FIG. 7, the electronic throttle control module 17 comprises a static characteristic modification unit 21 and a dynamic characteristic modification unit 24 comprised of a first-order lag filter 22 and an incomplete differential filter 23. The electronic throttle control module 17 receives actual accelerator operational movement x1 (accelerator operational movement signal), which is converted to virtual accelerator input x2 at the static characteristic modification unit 21 based on the predetermined static characteristics. Thereafter, the dynamic characteristic modification unit 24 determines and outputs an electronic throttle valve angle based on the virtual accelerator input x2. In the above, in FIG. 7, x1 is actual accelerator operational movement (accelerator operational movement signal), x2 is virtual accelerator input, y is accelerator valve angle, f is static characteristic function, T is first-order lag time constant, Td is differential time, $\alpha$ is acceleration compensation factor, $\eta$ is differential gain. In the above, the static characteristic function, the first-order lag time constant, the acceleration compensation factor, the differential time or differential gain are variable control parameters. However, in this embodiment, the static characteristic function is selected by the user from those which have been prepared beforehand. Further, in this embodiment, the differential gain of the dynamic characteristics is fixed, the first-order lag time constant, the acceleration compensation factor, and the differential time are subjected to evolution. In other embodiments, the above can be changed. In the embodiment explained below, the first-order lag time constant the acceleration compensation factor, and the differential time are generally referred to as "electronic throttle parameters."

The initial value setting unit for electronic throttle control parameters determines and outputs initial values of the aforesaid first-order lag time constant T, the acceleration compensation factor $\alpha$, and the differential time Td.

Evolution Fitness Layer

At the evolution fitness layer 13, compensation values of the electronic throttle control parameters are subjected to evolution in such a way that the electronic throttle control parameters evolve in accordance with the user's preferences.

As shown in FIG. 6, the evolution fitness layer 13 comprises an evolution fitness unit 19.

The evolution fitness unit 19 comprises control modules 20 (drivability modules) which determine compensation values of the electronic throttle control parameters from the reflection layer 15. Between the user 11 and the evolution fitness layer 13, a drivability evaluation unit 16 is provided for evaluating the control modules in accordance with the user's preferences. At the drivability evaluation unit 16, evaluation of each individual is performed based on the user's evaluation, when the control modules 20 of the evolution fitness unit 19 evolve by means of genetic algorithms. The drivability evaluation unit 16 can be regarded as a part of the evolution fitness layer 13. To the evolution fitness layer 13, the learning layer 14, the reflection layer 15, and the electronic throttle control module 17, input from the user 11 and input of external information 12 such as throttle input and engine revolutions are introduced.

FIG. 8 shows an embodiment of the control module 20 at the evolution fitness layer. As shown in this figure, the control module uses normalized accelerator operational movement and normalized engine revolutions as input information. The control module outputs, as output information, compensation values for the electronic throttle control parameters at the reflection layer 15, that is, compensation values AT, Aα, and ATD of the first-order lag time constant T, the acceleration compensation value α, and the differential time Td, respectively. That is a two-input three-output type neural network.

At the evolution fitness layer 13, several chromosomes (individuals) are generated by coding them with genes, that is, coupling coefficients or weighting factors of the neural network constituting each control module 20 in the evolution fitness unit 19. Each individual 20 generated is subjected to selection based on evaluation at the evaluation unit 16. The remaining individuals 20 are subjected to crossover to generate individuals of a next generation. Further, the generated individuals are subjected to selection, and these processes are repeated, thereby evolving each control module of the evolution fitness layer 13 in accordance with evaluation at the evaluation unit 16.

The evolution processes described above will be explained below.

Figure 9:
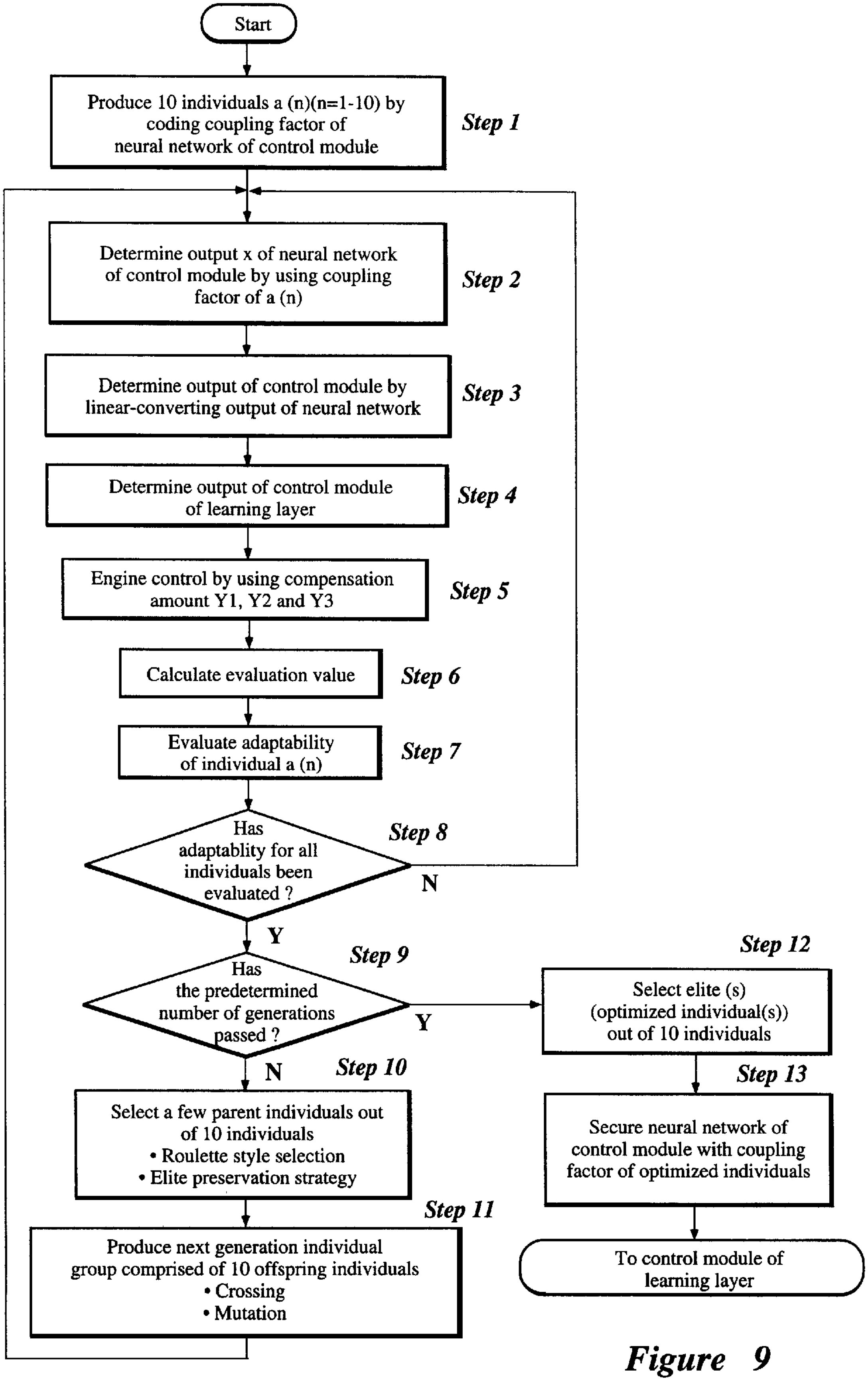
FIG. 9 is a flow chart showing evolution flow of control modules by means of generic algorithms.

FIG. 9 is a flow chart showing evolution flow of control modules by means of generic algorithms.

Figure 10:
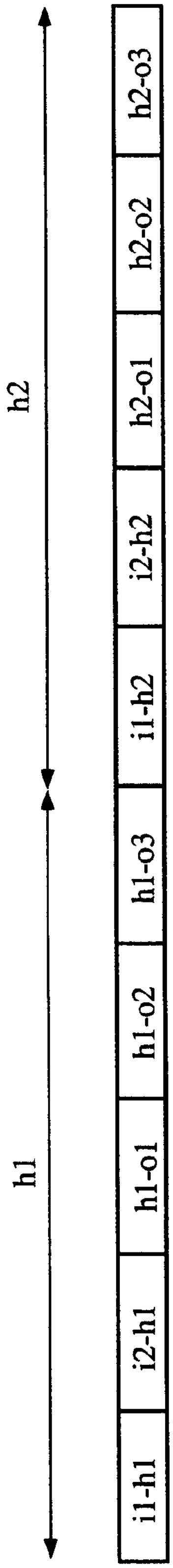
FIG. 10 is an embodiment of a first generation of drivability modules comprising plural individuals a(n) (in this embodiment, n=10) created by using, as genes, coupling coefficients of the neural network shown in FIG. 8.

Initially, as shown in FIG. 10, a first generation of drivability modules comprising plural individuals a(n) (in this embodiment, n=10) is created by using, as genes, coupling coefficients of neural networks of control modules (step 1). In the above, the initial values of the genes of each individual (i.e., initial values of coupling coefficients of the neural networks) are determined randomly within a pre-set range (e.g., approximately −10 to 10). In the above, by creating one individual having a gene value (coupling coefficient value) of zero, it is possible to avoid abating, in the process of evolution, the performance characteristics lower than those before evolution, and to maintain variety of individuals.

The coupling coefficients of one of the individuals a(n) created in step 1 (for example, individual a(1)) are then used and fixed as the coupling coefficients of the neural network of the control module so as to determine outputs At, Aα, and ATd of the neural network in response to the actual input information (engine revolutions and accelerator operational movement) (step 2). The outputs are then linearly transformed using equations (1)–(3) to determine outputs ATy1, Aαy1, and ATdy1 (i.e., electronic throttle valve control parameter compensations) corresponding to individual an(1) (step 3). In the above, the engine revolutions and the accelerator operational movement, used as input information, are normalized in advance.

$$Aty1=2\times GAT-G \tag{1}$$

$$A\alpha y1=2\times G\alpha-G \tag{2}$$

$$ATdy1=2\times ATd-G \tag{3}$$

In the equations, ATy1, Aαy1, and ATdy1 are outputs of the control module, AT, Aα, and ATd are outputs of the neural network of the control module, G is an output gain at the evolution fitness layer. As described above, by using the outputs of the neural network after linear transformation, outputs ATy1, Aαy1 , and ATdy1 of the control module do not rise extremely, and the evolution can progress gradually, thereby preventing sudden extreme changes in engine behavior in response to the results of evaluation or evolution.

After outputs ATy1, Aαy1, and ATdy1 for individual a(1) are determined, outputs ATy2, Aαy2, and ATdy2 of the learning layer corresponding to respective control parameter compensation values are determined (step 4). The outputs of the control module and the outputs of the learning layer are added to obtain compensations Y1, Y2, and Y3. Accordingly, the electronic throttle control parameters at the reflection layer are modified, and the vehicle is actually operated using the modified control parameters (step 5). Evaluation of individual a(1) by the user is then inputted (step 6), thereby determining evaluation values of fitness of individual a(1) (step 7). In the above, the output of the learning layer is set at zero initially, so that the learning layer can learn the results of evolution after the evolution process at the evolution fitness layer. Details of the learning layer will be described later.

In step 6, the evaluation of each individual by the user can be inputted via an evaluation input device of a push-button type in order to enable the user to input his or her evaluation during driving or operation. In practice, for example, when the user pushes the button, the individual is evaluated based on the length of time the button is being pushed in step 7. A method of calculating an evaluation value in step 7 includes, for example, a calculation method by multiplying an inverse number of the length of pushing time by a pre-set constant, and a calculation method by using fuzzy rules based on the length of pushing time. By adapting the above, even if the user's evaluation is ambiguous, an evaluation value can be obtained with certain accuracy. Further, if the user keeps pushing the button for a period of time longer than a pre-set range, the individual can be dropped immediately. Accordingly, the user or driver can select individuals having undesirable characteristics immediately, and thus the characteristics of the undesirable individuals will not be carried on to subsequent generations. In this way, evolution can be promoted and processed quickly. Steps 6 and 7 are conducted at the evaluation unit.

The processes of steps 2 to 7 are conducted for all individuals created in step 1, and after it is judged whether fitness values of all of the individuals are evaluated (step 8), it is judged whether the evolution process is repeated pre-set times, i.e., for pre-set numbers of generations (step 9).

Before reaching the pre-set numbers of generations, parent individuals are selected for a next generation from the ten individuals created in step 1 (step 10). This selection can be conducted by a roulette system, and several parent individuals are selected at a probability correlated to the fitness of each individual.

In the above, if alternation of generations is conducted strictly, there is a possibility of abandoning an individual having a high evaluation value. Thus, an elite preservation strategy for preserving the elite (the individual of the highest evaluation) for a next generation without conditions can be adopted in addition to the above. Fitness is subjected to linear transformation in order to render constant the ratio of the highest fitness of plural individuals to the average fitness.

After completion of selection of parent individuals, ten offspring individuals (children) are generated from the selected parent individuals by performing crossover processing (step 11). In the above, the crossover between individuals may be single-point crossover, double-point crossover, or normal distribution crossover.

The normal distribution crossover is a method of creating offspring based on a rotation-symmetrical normal distribution with respect to an axis connecting the parents, using chromosomes expressed by the actual number (individuals). The standard deviation of the normal distribution is correlated with the distance between the parents in terms of the components in the direction of the main axis connecting the parents. Other components of the axis are made correlated with the distance between the line connecting the parents and a third parent sampled from the group. This crossover method has the advantage that the characteristics of the parents are easily passed on to their offspring.

After the creation of the ten offspring individuals, mutation of genes is caused in the created ten offspring individuals by randomly changing the gene value (the degree of coupling) at a given probability. In the above, the ten offspring individuals include the individual which makes the output from the evolution fitness layer zero.

According to the above processes, after the second generation is created, the evolution processes from step 2 are repeated.

The above evolution processes are repeated until the number of generations reaches a pre-selected number. Accordingly, the offspring individuals constituting each generation are subjected to selection based on the evaluation at the evaluation unit, that is, the user's preferences, thereby creating the next generation. Thus, the input-output relationship of the first control module evolves to gradually change to those the user likes. It is judged in step 9 whether the pre-selected number of generations has passed. If the generation is judged to be the final generation in step 9, the most fit individual (the most preferable individual) is selected from the ten offspring individuals, that is, one elite individual is selected (step 12). The coupling coefficients of the neural network of the control module are fixed at the genes of the most fit individual (step 13), and then the learning processes for the control module for learning in the learning layer will be activated.

Learning Layer

The learning layer will be explained below.

The learning layer learns output of the evolved control module obtained in the evolution fitness layer (in this embodiment, electronic throttle control parameter compensations) in order to reflect the output of the evolution fitness layer after evolution when the reflection layer outputs. If output of the control module of the evolution fitness layer does not depend on driving conditions, that is, if there is no information about driving conditions in input of the control module, the output of the learning layer can simply be the sum of the output of the control module of the learning layer and the output of the control module of the evolution fitness layer. If the output of the control module of the evolution fitness layer includes information depending on driving conditions, the learning layer needs to learn the relationship between the driving conditions of the vehicle and the output of the evolution fitness layer. Thus, in that case, the learning layer comprises a control module for learning and a control module for operation. In this embodiment, the control module of the evolution fitness layer has a control module constituted by the neural network to which the engine revolutions, as one of driving conditions, are inputted. Thus, the learning layer has two types of control modules. That is, the learning layer has control modules corresponding to the control module of the evolution fitness layer, which control modules are composed of two control modules (not shown) wherein while one module functions as a control module for operation, the other control module functions as a control module for learning, and they can functionally switch from one another. In the above, the control module can be any control module capable of learning, including neural networks and CMAC (Cerebellar Model Arithmetic Computer). The CMAC is excellent in terms of additional learning and high speed of learning, as compared with the hierarchical neural network.

After the neural network constituting the module of the evolution fitness layer is fixed at the coupling coefficients of the most fit individual at the time subsequent to passing the pre-selected number of generations subjected to the evolution processes, the learning layer uses teacher data which are the input-output relationship of the evolution fitness layer in combination with the input-output relationship of the control module of the learning layer functioning as a control module for operation.

Figure 11:
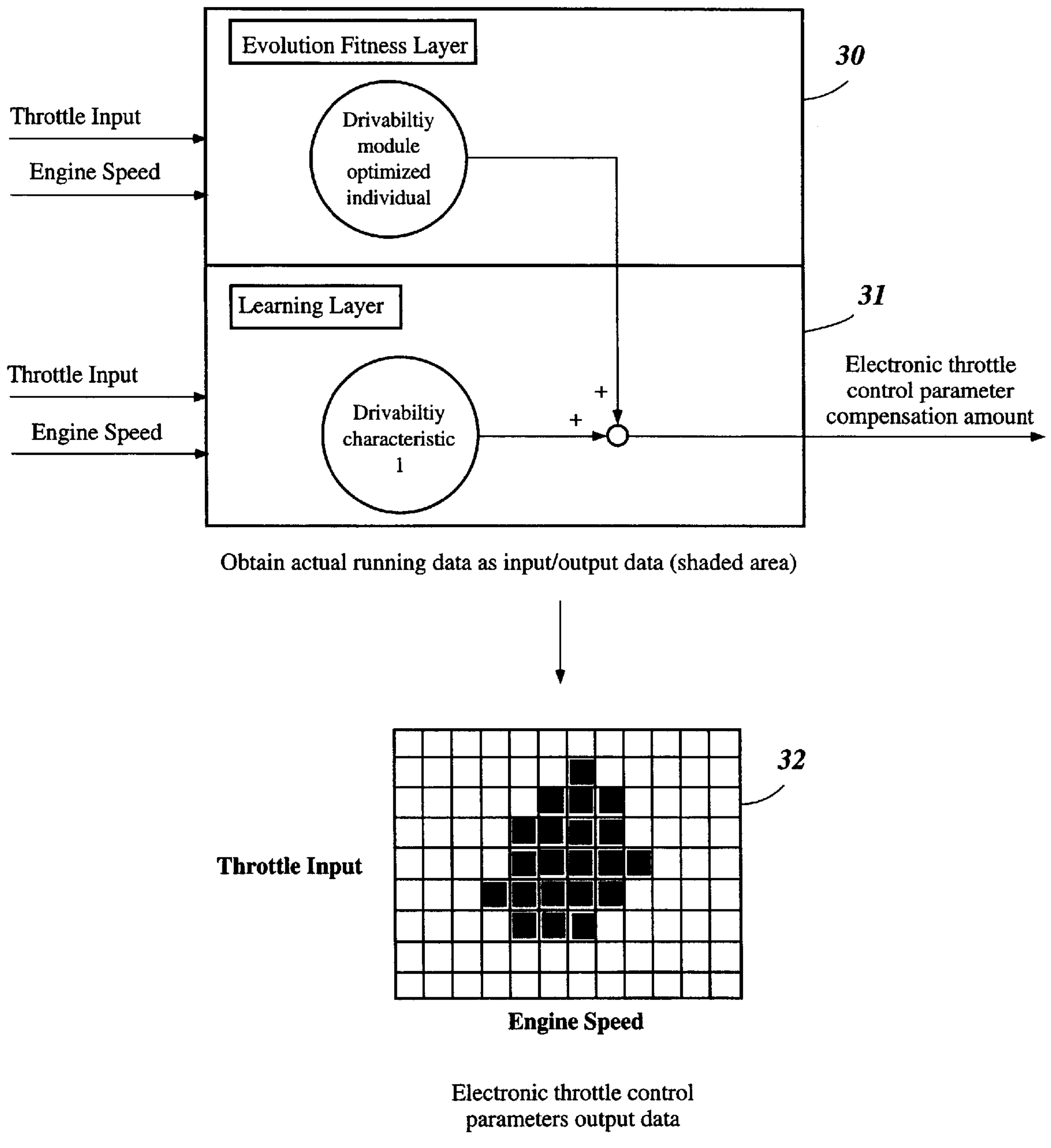
FIG. 11 is a diagram showing an embodiment of the input and output of the evolution fitness layer and the learning layer, wherein the learning layer learns the control parameters defined by the throttle angle and the engine revolutions.

In practice, as shown in FIG. 11, the input and output of an evolution fitness layer 30 and a learning layer 31 are averaged per time length of the step, and the averages are used as teacher data. For example, the average engine revolutions per minute is 5,000 r.p.m.'s, and the average degree of the throttle opening is 20%, the sum of these values and the electronic throttle control parameter compensations outputted from the evolution-fitness layer and the neural network for operation of the learning layer is used as teacher data 32. Further, by recording the time the teacher data are obtained, teacher data produced most recently can be more highly weighted than older teacher data.

When the control module for learning of the learning layer obtains teacher data, the control module begins learning based on the teacher data, and ends learning when a deviation between the output of the control module for learning and the output of the control module of the evolution fitness layer is below a threshold value. After completion of learning, the control module for learning and the control module for operation are switched, and output of each control module of the evolution fitness layer is set at zero or at output for a subsequent evolution step. In the above, during learning of the control module for learning, the control module of the evolution layer continues outputting the electronic throttle control parameter compensations fixed with the most fit coupling coefficients. The control parameters modified by compensation values, which are the sum of the above output of the evolution fitness layer and the output of the control module for operation of the learning layer, are used for calculation in the electronic throttle control modules of the reflection layer. The initial value of the control module for operation of the learning layer is set to always make output zero. Accordingly, initially, by simply using the output of the evolution fitness layer, i.e., without using the output of the learning layer, the reflection layer output can be controlled.

The information about the control module obtained by learning at the learning layer can be saved in an internal memory media or external memory media, so that the user can retrieve saved characteristics as necessary, and can drive using the retrieved characteristics. Accordingly, by saving and retrieving the results of learning, the user can select driving characteristics based on the user's feeling.

Figure 12:
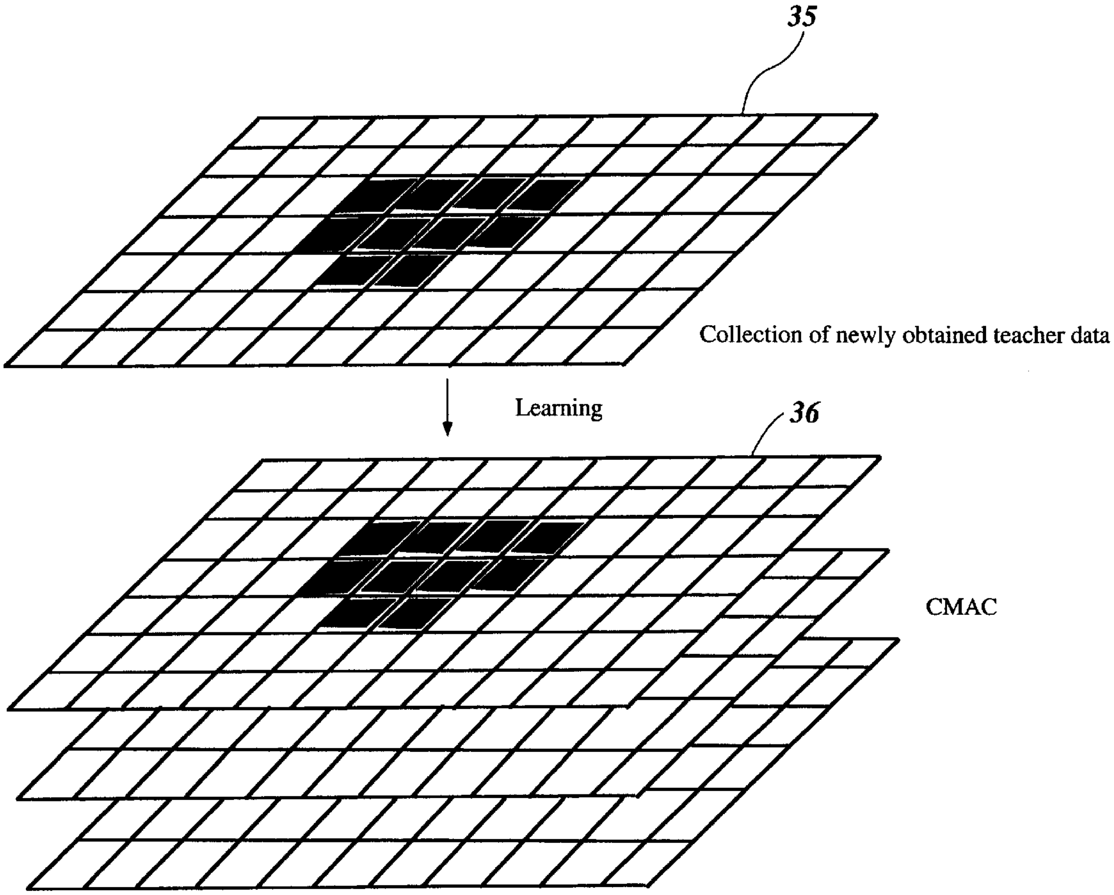
FIG. 12 is a diagram showing an embodiment of the control module constituted

In the above, if the control module of the learning layer is a neural network, the learning can be conducted using a conventional learning method. If the control module is constituted by a CMAC, newly obtained teacher data 35 can exclusively be subjected to learning (36), thereby improving learning efficiency, as shown in FIG. 12.

Outline of Evolution

Figure 13:
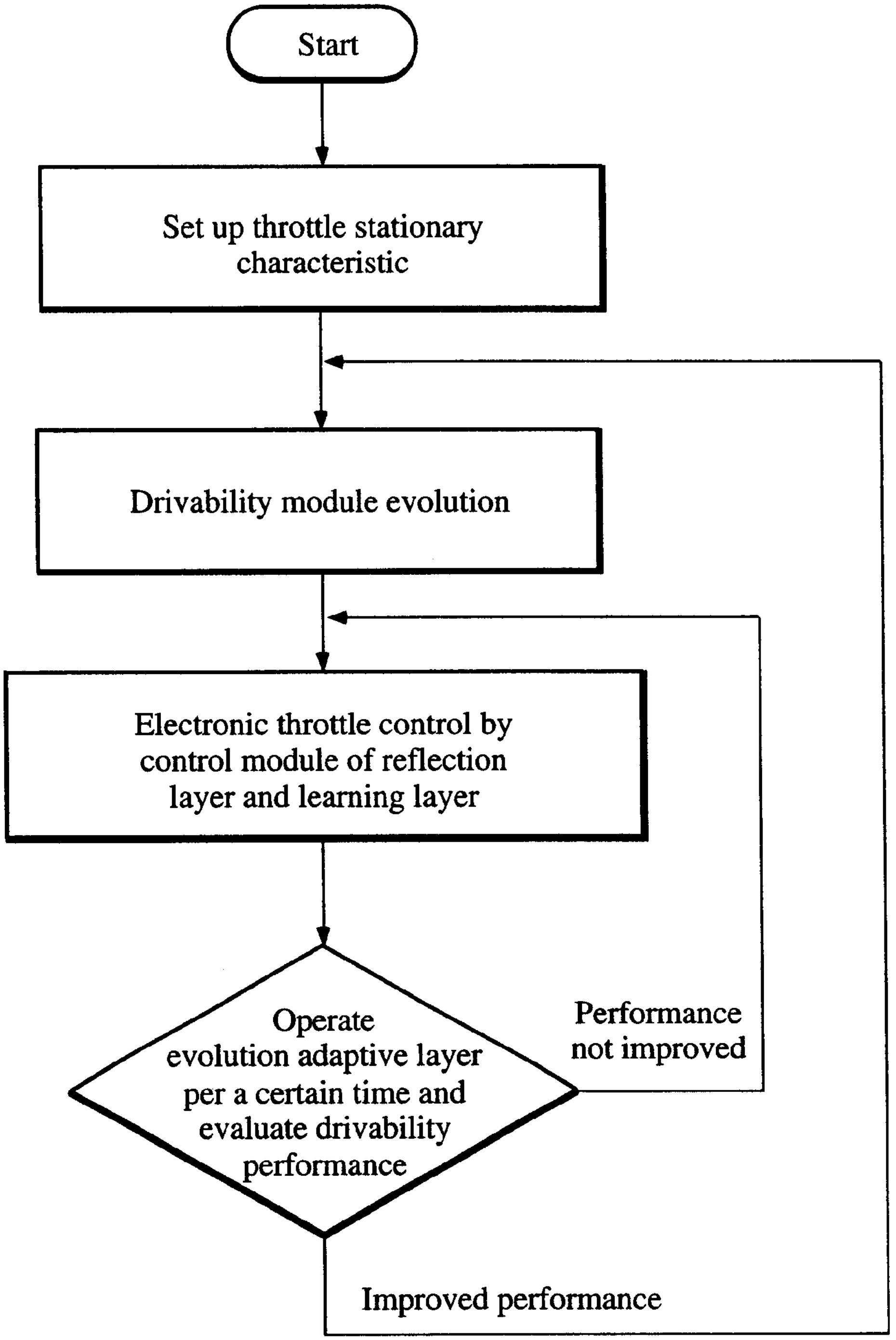
FIG. 13 is a flow chart showing an embodiment of evolution processes at the evolution fitness layer.

The above mentioned evolution processes can be summarized below. The entire evolution flow at the evolution fitness layer is as follows: As shown in FIG. 13, the evolution fitness layer sets static characteristics of the throttle as the first step after the evolution processes are activated (step 1). This setting of the static characteristics can be conducted by selecting those from several static characteristics pre-selected by the user, or by pre-setting the static characteristics in advance.

After completion of setting the static characteristics, the control modules at the evolution fitness layer evolve by repeating creation of individuals, evaluation of them, and selection of them, as described above. After the pre-set number of generations pass, the learning layer undergoes learning of the results of the evolution (step 2). After completion of learning at the learning layer, the evolution fitness layer stops outputting, and the electronic throttle control by the reflection layer and the learning layer is conducted, that is, the electronic throttle control is conducted by using electronic throttle control parameters modified by compensations outputted from the learning layer (step 3). Thereafter, the evolution fitness layer is activated at pre-set time intervals, and drivability is evaluated. If drivability is not improved, the control by the reflection layer and the learning layer continues. If drivability is improved, the evolution processes from step 2 are automatically initiated again (step 4).

In the above, the evolution processes can be constituted in such a way as to be activated immediately after the engine starts, or by the user's instructions. After the evolution processes are completed once, the evolution processes can be initiated again when the performance is improved after activating the evolution fitness layer at pre-set time intervals, or the evolution fitness layer can be initiated again whenever the user wishes.

Output Control System Applied to Electric Motor

The output control system of the present invention will be explained when applied to an electric motor installed in an electric motor-driven vehicle.

Figure 14:
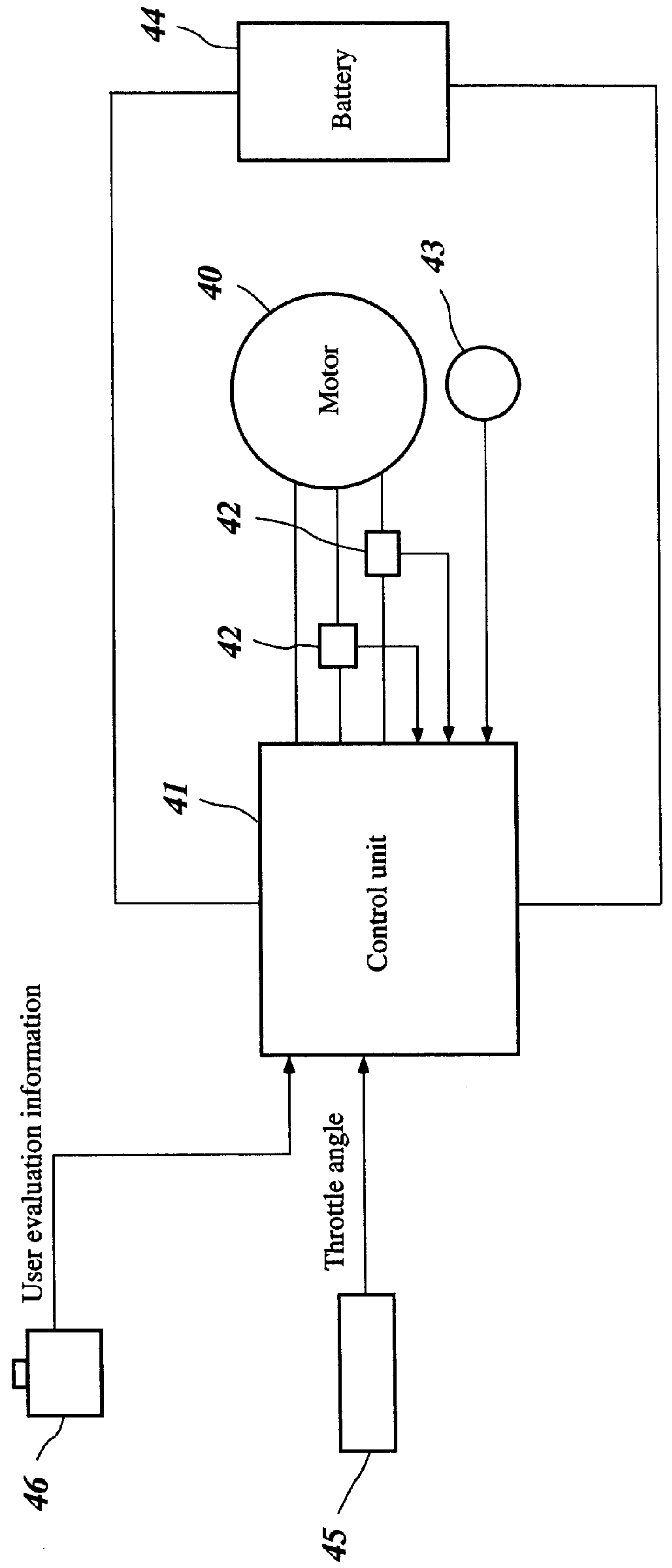
FIG. 14 is a schematic view showing an embodiment of the relationship between an electric motor and a control unit carrying out output control.

FIG. 14 is a schematic view showing the relationship between an electric motor 40 and a control unit 41 carrying out output control.

The electric motor 40 indicated in this figure is a three-phase alternating current servo-motor. The control unit 41 determines electric current passing through the motor 40 from a battery 44 based on the accelerator operational movement detected by an accelerator operational movement detection sensor 45 which senses operational movement of the accelerator grip (not shown) by the user.

Figure 15:
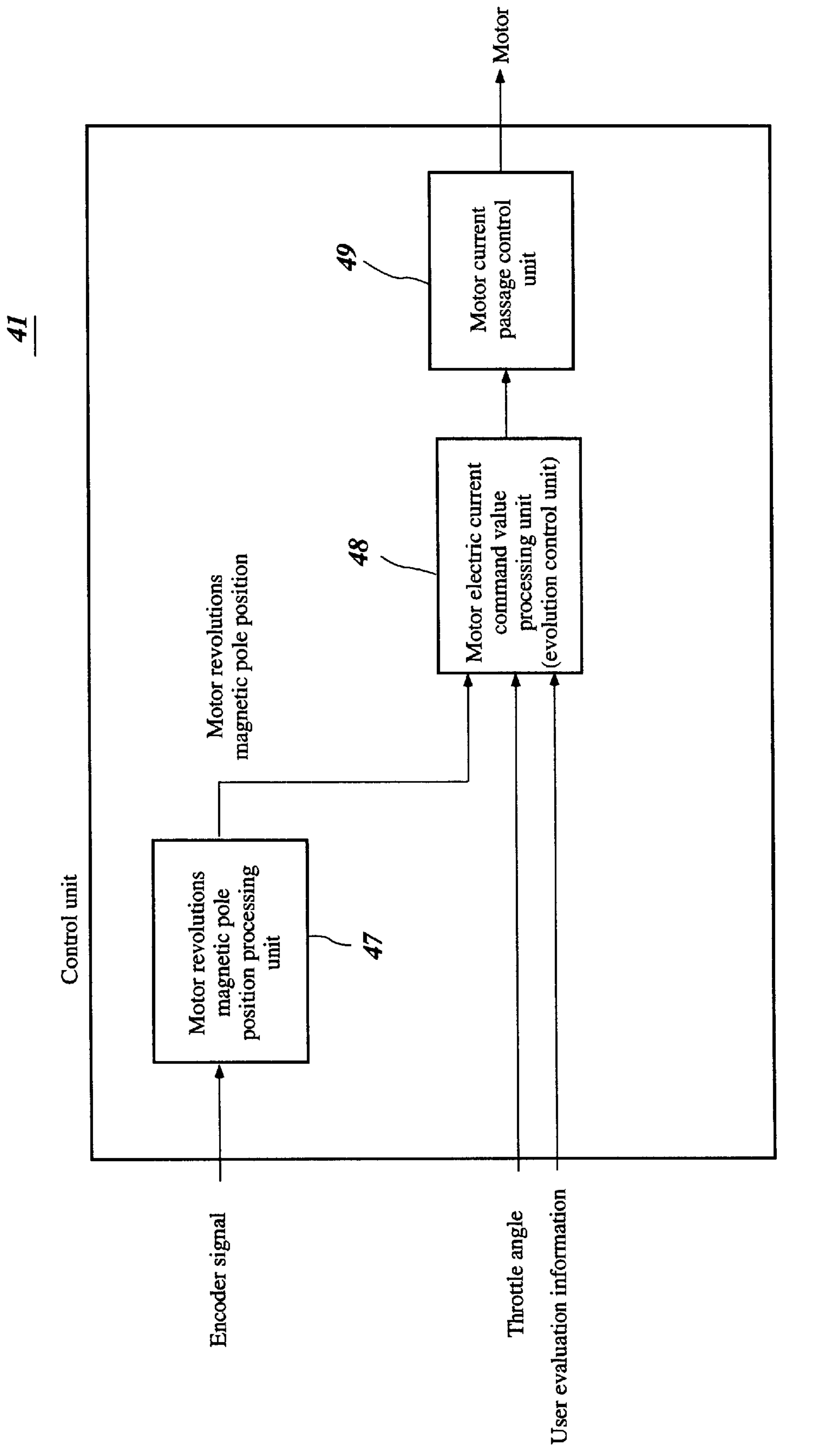
FIG. 15 is a schematic block diagram showing an embodiment of the internal structures of the control unit.

FIG. 15 is a schematic block diagram showing the internal structures of the control unit 41. The control unit comprises a motor revolutions/magnetic pole position processing unit 47, which calculates motor revolutions and the magnetic pole position based on encoder signals from an encoder 43, a motor electric current command value processing unit (evolution control unit) 48, which determines a electric current command value to be sent to the motor 40 based on accelerator operational movement detected by an accelerator operational movement detection sensor 45, and a motor current passage control unit 49, which passes alternating current having a different phase through the motor 40 by converting direct current from the battery 44 to alternating current based on the motor current command value from the motor current command processing unit 48.

Figure 16:
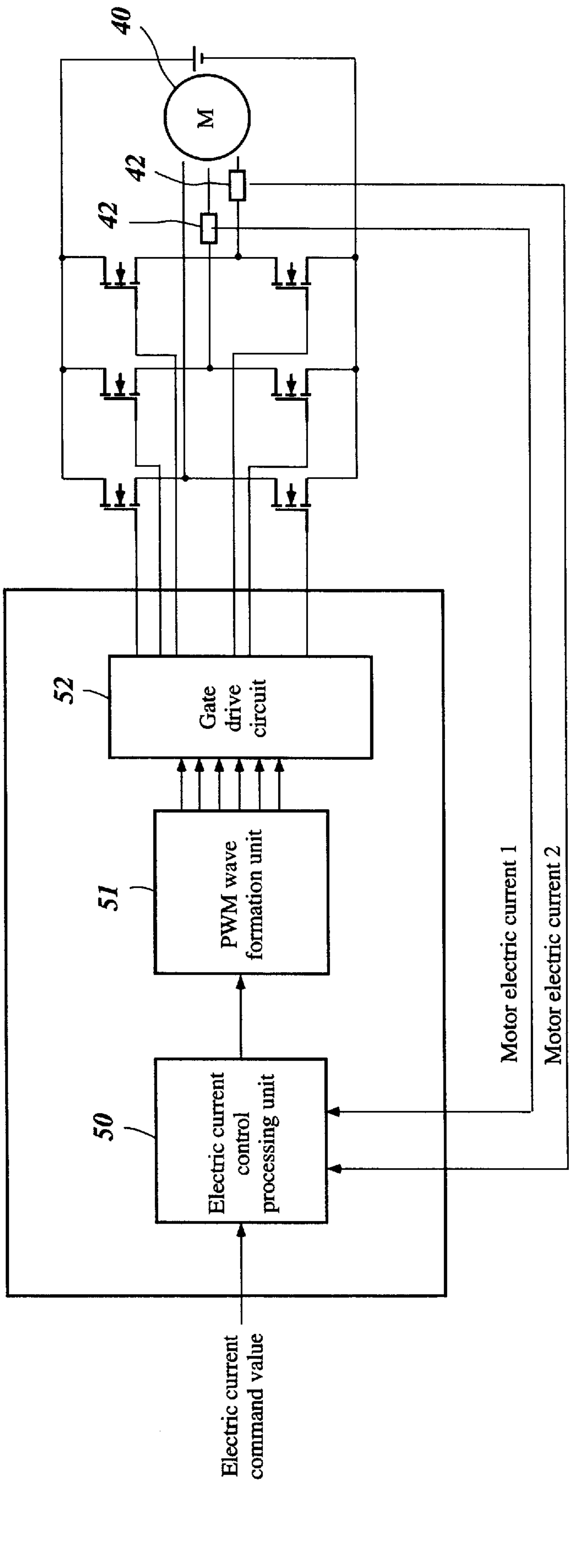
FIG. 16 is a block diagram schematically showing an embodiment of the internal structures of the motor current passage control unit.

FIG. 16 is a block diagram schematically showing the internal structures of the motor current passage control unit 49. As shown in FIG. 16, the motor current passage control unit 49 comprises an electric current control processing unit 50, which controls electric current passing through the motor based on the motor current command value from the motor current command processing unit 48 (evolution control unit) and motor currents 1 and 2 fed back from the motor 40 via electric current sensors 42, a PWM wave formation unit 51, which forms a PWM wave based on control signals outputted from the electric current control processing unit 50, and a gate drive circuit 52.

Further, as shown in FIGS. 14 and 15, the motor current command value processing unit 48 (evolution control unit) of the control unit 41 receives user evaluation information via an evaluation input device 46 of a push-button type. Based on the user evaluation information, the current command value processing unit 48 (evolution control unit) evolutionarily changes the relationship between the above input information and the output information, i.e., evolutionarily changes the motor current command value in response to the accelerator operational movement by the user. These structures allow the output characteristics of the vehicle equipped with the electric motor to be adapted to the preferences of the user regarding drivability.

The characteristics of the motor current command valve (current passage characteristics) responsive to the accelerator operational movement can be classified into two driving characteristics, i.e., static characteristics and dynamic characteristics.

The static characteristics describe the relationship between the accelerator operational movement and the current command value when the accelerator operational movement (i.e., a manipulation angle of the accelerator grip) is constant. The static characteristics represent normal driving characteristics of the vehicle.

Figure 17C:
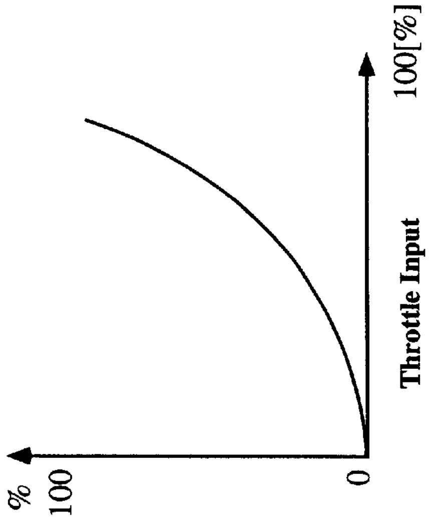
FIGS. 17(*a*), 17(*b*), and 17(*c*) show changing patterns of the static characteristics in response to the manipulated angle of the accelerator grip.
Figure 17B:
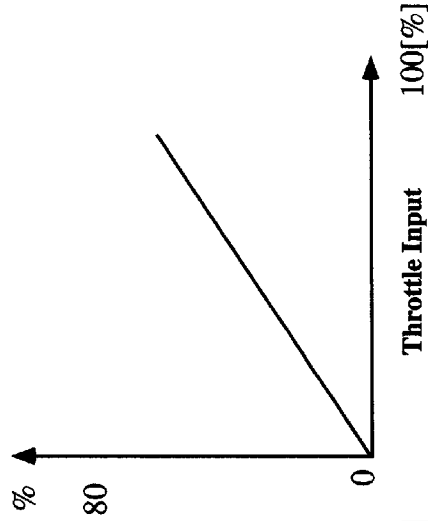
Figure 17A:
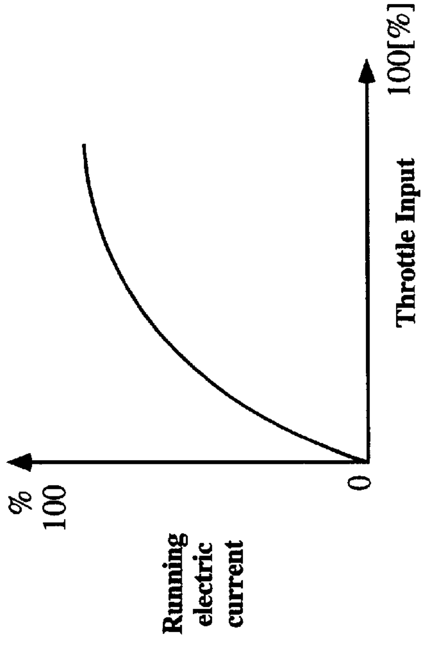

As described above, by changing the static characteristics, as shown in FIG. 17, when the manipulated angle of the accelerator grip is small, the running current increases quickly. As the manipulated angle of the accelerator grip increases, the running current gradually increases until the running current is maximum in a small-angle rapid-acceleration type (see FIG. 17(*a*)). The manipulated angle of the accelerator grip is proportional to the running current in a proportion type (see FIG. 17(*b*)). When the manipulated angle of the accelerator grip is small, the running current increases gradually, and when the manipulated angle of the accelerator grip is large, the running current increases rapidly until the running current is at maximum level in a large-angle rapid-acceleration type (see FIG. 17(*c*)). As shown above, various running current values can be obtained at the same manipulated angle of the accelerator grip. These static characteristics can be in the form of any functions if the running current increases or is constant in response to an increase in the accelerator operational movement and if the running current is zero when the accelerator operational movement is zero. By changing the static characteristics, different signals of the running current values can be outputted in response to the same accelerator operational movement.

Figure 18:
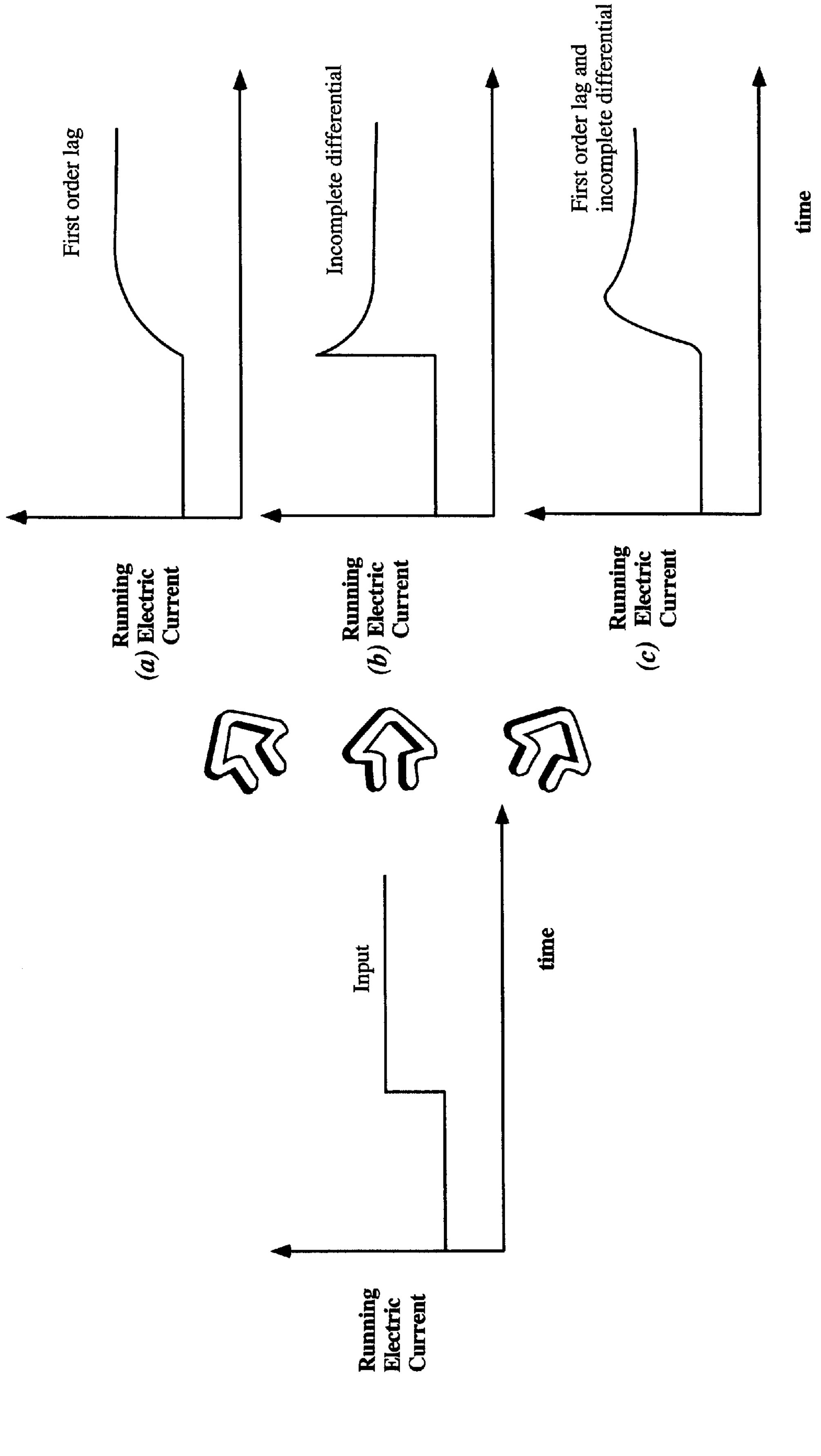
FIG. 18 shows several dynamic characteristics when the electric motor is activated, wherein (a) shows an embodiment of a low-response type, (b) shows an embodiment of a high-response type, and (c) shows an embodiment of an intermediate type between the low-response type and the high-response type.
Figure 19:
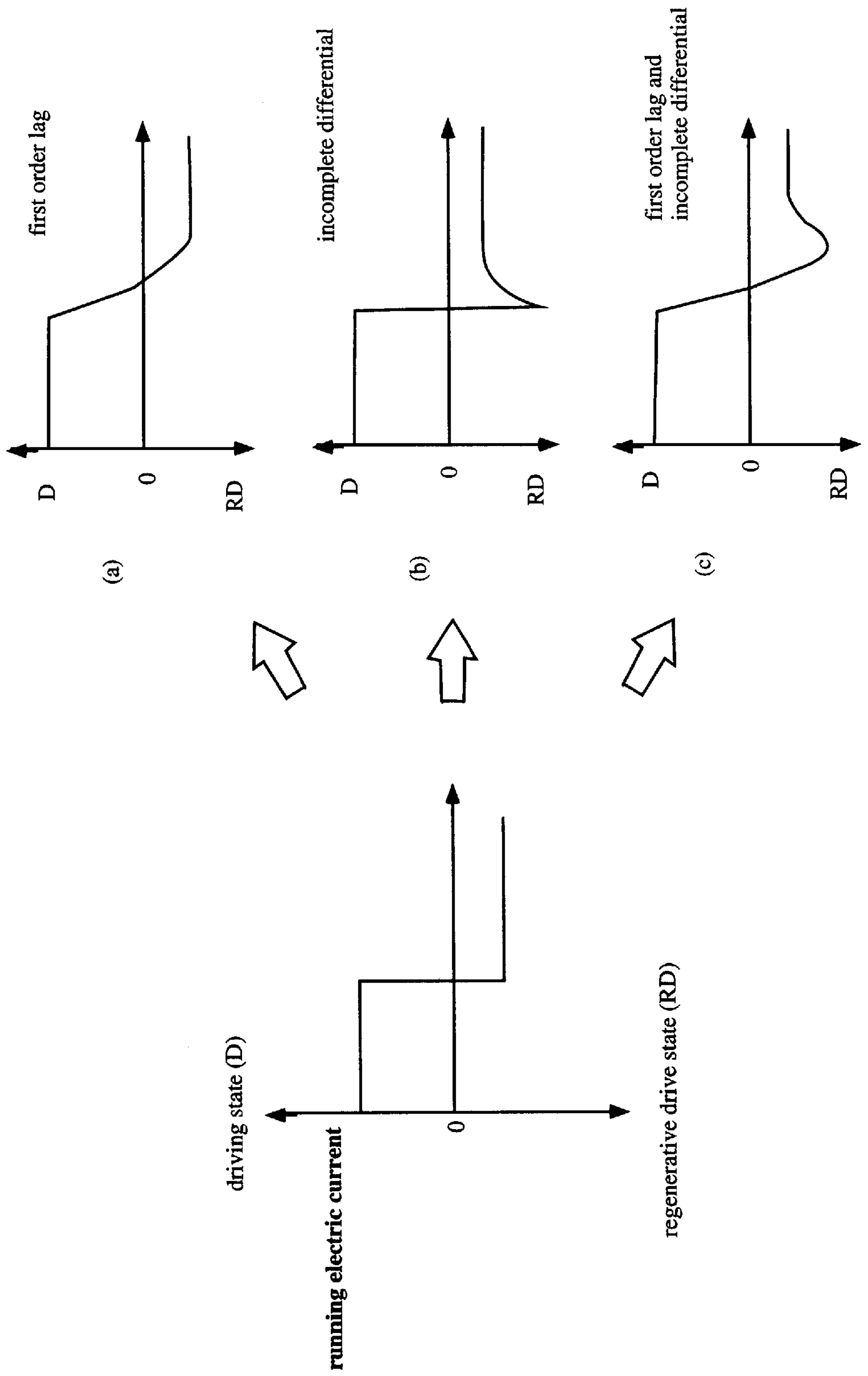
FIG. 19 shows several dynamic characteristics when the electric motor is in a regenerative mode, wherein the types indicated in (a)–(c) correspond to (a)–(c) in FIG. 18.

The dynamic characteristics represent the relationship between changes in the accelerator operational movement and changes in the current command values, and are involved in transient characteristics of vehicles. In practice, the dynamic characteristics can be changed by combining a first-order lag filter and an incomplete differential filter, and by changing these parameters. FIG. 18 shows several dynamic characteristics when the electric motor is activated. The electric current increases relatively slowly in response to accelerator operation in a low-response type (see FIG. 18(*a*)). The electric current increases highly responsively although a slight spike appears in response to acceleration operation in a high-response type (see FIG. 18(*b*)). In an intermediate type, the response is half-way between the low-response type and the high-response type (see FIG. 18(*c*)). FIG. 19 shows several dynamic characteristics when the electric motor is in a regenerative mode. The types indicated in FIGS. 19(*a*)–(*c*) correspond to FIGS. 18 (*a*)–(*c*).

Evolution Control Unit

The structure of the evolution control unit will be explained in detail below.

FIG. 20 is a block diagram showing an embodiment of the evolution control unit.

As shown in this figure, as in the first embodiment, the evolution control unit comprises a reflection layer 65, a learning layer 64, and an evolution fitness layer 63.

The reflection layer 65 comprises a motor control parameter initial value setting unit 68. As a basic control unit, a motor control module 67 is provided. To the evolution fitness layer 63, the learning layer 64, the reflection layer 65, and the motor control module 67, input from the user 61 and input of external information 62 such as throttle input, motor revolutions, and magnetic pole position are introduced.

As in the first embodiment, the motor control module 67 comprises a static characteristic modification unit and a dynamic characteristic modification unit comprised of a first-order lag filter and an incomplete differential filter. The motor control module receives actual accelerator operational movement which is converted to virtual accelerator input at the static characteristic modification unit based on the predetermined static characteristics. Thereafter, the dynamic characteristic modification unit determines and outputs a running current valve based on the virtual accelerator input. In the above, initial values of the motor control module, which are used in the static characteristic modification unit and the dynamic characteristic modification unit, are set at the motor control parameter initial value setting unit.

At the evolution fitness layer 63, compensation values of the motor control parameters are subjected to evolution in such a way that the motor control parameters evolve in accordance with the user's preferences.

The evolution fitness layer 63 comprises an evolution fitness unit 69.

The evolution fitness unit 69 comprises control modules 70 which determine compensation values of the motor control parameters from the reflection layer 68. Between the user 61 and the evolution fitness layer 63, a drivability evaluation unit 66 is provided for evaluating the control modules 70 in accordance with the user's preferences. At the drivability evaluation unit 66, evaluation of each individual is performed based on the user's evaluation, when the control modules 70 of the evolution fitness unit evolve by means of genetic algorithms.

In practice, the control module 70 of the evolution fitness layer is constituted by a neural network and uses, as input information, at least one of normalized accelerator operational movement, normalized motor revolutions, and normalized magnetic pole position. The control module outputs, as output information, compensation values for the motor control parameters from the reflection layer 65, that is, compensation values of the first-order lag time constant, the acceleration compensation value, and the differential time.

At the evolution fitness layer 63, several chromosomes (individuals) are generated by coding them with genes, that is, coupling coefficients or weighting factors of the neural network constituting each control module in the evolution fitness unit. Each individual generated is subjected to selection based on evaluation at the evaluation unit. The remaining individuals are subjected to crossover to generate individuals of a next generation. Further, the generated individuals are subjected to selection, and these processes are repeated, thereby evolving each control module of the evolution fitness layer in accordance with evaluation at the evaluation unit.

The evolution processes at the evolution fitness layer 63 based on genetic algorithms are basically the same as in the first embodiment, and thus explanation is omitted.

As in the first embodiment, the learning layer 64 comprises a neural network for learning and a neural network for operation. While operating the neural network for operation, the neural network for learning undergoes learning information (the input-output relationship) of the control module of the evolution fitness layer 63 which has finished evolution. After completion of learning, the neural network for learning and the neural network for operation are functionally switched.

As explained in the first and second embodiments, the relationship between the operational movement of the accelerator used as the primary output-controller, and the driving movement of the stepping motor for driving the throttle valve or the running current signal provided to the control unit for controlling running current through the motor, used as the secondary output-controller, is subjected to evolution by genetic algorithms in accordance with the user's evaluation, thereby allowing the vehicle to output drivability in accordance with the user's preferences. Further, because the user himself or herself can select individuals in the process of evolution, the user can enjoy training the vehicle for his or her use.

Other Aspects

In the present invention, correlations between various inputs and various outputs of the control system can be determined using existing techniques such as neural networks, fuzzy neural networks, and genetic algorithms if the correlations are highly complex, or using existing techniques such as maps and functional equations if the correlations are rather simple. In this regard, Da Ruan (editor) "Intelligent Hybrid Systems—Fuzzy Logic, Neural Networks, and Genetic Algorithms—" Kluwer Academic Publishers (1997), J.-S. R. Jang, C.-T. Sun, E. Mizutani, "Neuro-Fuzzy and Soft Computing" Prentice Hall Upper Saddle River, N.J. 07458 (1997), C.-T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) are hereby incorporated by reference. The above techniques can be combined, and learning control can be adapted for any techniques.

Further, in addition to genetic algorithms (GA), genetic programming (GP) or other evolutionary computing techniques can be adapted to the present invention (Wolfgang Banzhaf, et al. (editor), "Genetic Programming, An Introduction", pp. 363–377, 1999, Morgan Kaufmann Publishers, Inc., for example). These techniques are sometimes categorized as "heuristic control" which includes evolution, simulated annealing, and reinforcement learning method (S. Suzuki, et al., "Vision-Based Learning for Real Robot: Towards RoboCup", RoboCup—97 Workshop, 23, 24, and 29 August, 1997 Nagoya Congress Center, pp. 107–110; K. and Nurmela, et al., "Constructing Covering Designs By Simulated Annealing", pp. 4–7, Helsinki University of Technology, Digital Systems Laboratory, Technical Reports No. 10, January 1993, for example). These techniques can be adapted to the present invention without complication, based on the principle described earlier; that is, in the present invention, "evolutionary computing" includes the above various techniques.

In the above, the static characteristics of the secondary output-controller (the stepping motor or the running current control unit) in response to the primary output-controller (the accelerator operational movement) are pre-set by the user, and only the dynamic characteristics are subjected to evolution. However, the present invention is not limited to the above, and includes an embodiment wherein an integrated control module for controlling both the static characteristics and the dynamic characteristics is installed in the evolution fitness layer, thereby subjecting the integrated control module to evolution. In another embodiment, a control module for the static characteristics and a control module for the dynamic characteristics are separately installed in the evolution fitness layer, and the control modules are separately subjected to evolution. When the control module for the static characteristics and the control module for the dynamic characteristics are separately installed in the evolution fitness layer, the evolution processes can be performed in parallel or in order such that one of the control module, preferably the control module for the static characteristics, is subjected to evolution first, and after completion of evolution, the evolved control module is fixed, and the other control module is subjected to evolution, for example.

In addition, in the aforesaid embodiments, the evolution processes are designed to end when each control module is subjected to evolution until a pre-selected number of generations passes. The present invention is not limited to the above, and includes an embodiment wherein the evolution processes at each control module continue until evolution reaches convergence.

Further, in the aforesaid embodiment, the input device of a push-button type is used, and the time length of the button being pushed by the user is used for evaluating each individual. The present invention is not limited to the above, and includes any method such as an embodiment wherein all individuals are visually displayed on a monitor during evolution, and the user can select the most fit individual from the visually displayed individuals.

In the aforesaid embodiment, the evolution processes are conducted by selecting individuals during evolution in accordance with the user's preferences. The present invention is not limited to the above, and includes an embodiment wherein individuals are selected based on driving conditions of a vehicle, environmental changes, or deterioration of a driving power source with time.

In practice, based on manipulation patterns of a throttle or a brake, the driving conditions are determined, that is, congested roads, secluded roads, free ways, or city roads, and evaluation standards can be modified depending on the driving conditions. For example, the evaluation standards can be modified in such a way that if the road is judged to be a congested road, an individual having a low-responsibility high-fuel efficiency has a high evaluation, and if the road is judged to be a secluded road, an individual having a high-responsibility low-fuel efficiency has a high evaluation.

Further, for example, by measuring atmospheric temperature, humidity, and pressure, based on the information, the operational conditions are determined, and accordingly, the evaluation standards can be modified.

In another embodiment, by monitoring a decrease in output due to changes in the engine mount conditions, abrasion of a cam of a cam shaft, or abrasion of a piston ring, deterioration of a drive power source with time is determined, and based on the determination, the evaluation standards can be modified.

Other Applications

In the above embodiments, the output control of the drive power source installed in a vehicle is explained. However, the present invention is not limited to the above, and includes any type of vehicle with a drive power source, such as an outboard motor. Further, the present invention includes applications such as an auxiliary drive of a bicycle or wheelchair equipped with an electric motor or engine, or a personal or industrial robot.

The primary output-controller include the following:

(1) Application to a vehicle:
A throttle grip (accelerator pedal), brake bar (pedal), clutch bar (pedal), handle, steering wheel, and/or transmission.

(2) Application to a bicycle having an auxiliary electric motor or engine:
A pedal, brake bar, handle, and/or transmission.

(3) Application to an electric wheel chair:
A joy stick (a helper's operation of the wheel chair when in a helper mode).

(4) Application to a wheel chair having an auxiliary propelling device:
An operation ring provided on each wheel.

(5) Application to an outboard motor:
A throttle lever, and/or handle.

(6) Application to a water vehicle:
A throttle grip, and/or handle.

(7) Application to an unmanned helicopter:
A joy stick.

(8) Application to a personal robot:
Various switches, and/or voice.

Effects in Various Embodiments

The present invention in an embodiment can provide a control method for vehicles equipped with driving power to change and adapt the relationship between the primary output-controller and the secondary output-controller to the user's characteristics (such as preferences, skill, and conditions), driving conditions, environmental changes, and/or deterioration of driving power and peripheral parts with time.

In an output controlling method for controlling output of a driving power source installed in a vehicle, the relationship between the primary output-controller and the secondary output-controller can evolve by using evolutionary computing including generic algorithms and genetic programming based on at least one of the following: the user's characteristics, driving conditions, environmental changes, and deterioration of the drive power source with time.

Further, when subjecting the static characteristics to evolution, drivability of a vehicle with a motor (driving power source) in a normal driving state can evolve. When subjecting the dynamic characteristics to evolution, drivability of a vehicle with a motor in a transient driving state can evolve.

When subjecting first-order lag elements and differentiating elements, which are present in the relationship between the manipulated movement of the primary output-controller and the operated movement of the secondary output-controller, to evolution, responsibility of a vehicle with a motor can widely evolve.

In an embodiment, the relationship between the manipulated movement of the primary output-controller and the operated movement of the secondary output-controller is subjected to evolution conducted in accordance with the user's preferences, skill, or conditions. Accordingly, the motor can have output characteristics adaptive to the user's preferences, skill, or conditions. Further, the user can enjoy training the motor.

Further, when using an input device through which the user can input his or her preferences, the user's preferences can be determined based on the length of time the device is being touched, for example. Accordingly, even if the evaluation by the user is ambiguous to a certain extent, the user's preferences can be determined objectively or numerically. Thus, genetic algorithms or other evolutionary computing techniques can be used readily.

Although this invention has been described in terms of a certain embodiment, other embodiments apparent to those of ordinary skill in the art also are within the scope of this invention. Accordingly, the scope of the invention is intended to be defined only by the claims that follow.

Of course, the foregoing description is that of preferred embodiments of the invention, and various changes and modifications may be made without departing from the spirit and scope of the invention, as defined by the appended claims.

What is claimed is:

1. The method for controlling performance of a motor used by a user, which performance is controlled by a primary output-controller manipulated by the user and a secondary output-controller directly operating the motor based on the manipulated movement of the primary output-controller, wherein the relationship between manipulated movement of the primary output-controller and operated movement of the secondary output-controller is regulated by control parameters, said method comprising the steps of:

(a) on-line selecting fitted values of the control parameters by evolutionary computing programmed to select on a real-time basis the fitted values of the control parameters based on a pre-selected signal used as standards for selecting the values of the control parameters; while operating the motor; and (b) updating the relationship between manipulated movement of the primary output-controller and operated movement of the secondary output-controller based on the fitted values of the control parameters, wherein the secondary output-controller is controlled, adaptively unique to the user, to operate the motor based on manipulated movement of the primary output-controller mediated by the control parameters, wherein the relationship between the manipulated movement of the primary output-controller and the operated movement of the secondary output-controller includes first-order lag elements and differentiating elements, which relationship is theoretically incalculable and regulated by the control parameters.

2. The method according to claim 1, wherein, in step (a), the values of control parameters are used as genes.

3. The method according to claim 1, wherein, in step (a), the control parameters are regulated by coefficients which are used as genes, wherein the fitted values of the control parameters are derived by on-line selecting fitted coefficients by evolutionary computing programmed to select on a real-time basis the fitted coefficients.

4. The method according to claim 3, wherein the performance of the motor is indicated by indicative signals, and the relationship between the control parameters and the indicative signals is regulated by the coefficients, wherein the indicative signals are required to determine the control parameters.

5. The method according to claim 4, wherein the relationship between the control parameters and the indicative signals is defined by a neural network regulated by coupling coefficients which are used as the coefficients.

6. The method according to claim 5, wherein the evolutionary computing comprises a genetic algorithm using the coupling coefficients as genes.

7. The method according to claim 1, wherein the signal of selection standards in step (a) is derived by evaluating the user's real-time response to the performance of the motor.

8. The method according to claim 1, wherein the primary output-controller is an acceleration pedal or grip, and the secondary output-controller is a throttle valve for an internal combustion engine or a running current controller for an electric motor.

9. A system for controlling performance of a motor used by a user, which performance is controlled by a primary output-controller manipulated by the user and a secondary output-controller directly operating the motor based on the manipulated movement of the primary output-controller, said system comprising:

(i) a basic control unit for regulating the relationship between manipulated movement of the primary output-controller and operated movement of the secondary output-controller, said relationship being regulated by control parameters, wherein the relationship between the manipulated movement of the primary output-controller and the operated movement of the secondary output-controller includes first-order lag elements and differentiating elements, which relationship is theoretically incalculable and regulated by the control parameters; and (ii) an evolutionary computing unit programmed to output control parameters to the basic control unit by selecting on a real-time basis fitted values of the control parameters based on a pre-selected signal used as standards for selecting the values of the control parameters; while operating the motor, wherein the values of the control parameters of the basic control unit are replaced with the fitted values of the control parameters to update the input-output relationship of the basic control unit.

10. The system according to claim 9, wherein, in the evolutionary computing unit, the values of control parameters are used as genes.

11. The system according to claim 9, wherein, in the evolutionary computing unit, the control parameters are regulated by coefficients which are used as genes, wherein the fitted values of control parameters are derived by on-line selecting fitted coefficients by evolutionary computing programmed to select on a real-time basis the fitted coefficients.

12. The system according to claim 11, wherein the performance of the motor is indicated by indicative signals, and the evolutionary computing unit is comprised of a control parameter outputting unit and an evolutionary computing subunit, said control parameter outputting unit programmed to output the control parameters when receiving indicative signals indicating the performance of the motor, wherein the input-output relationship of the control parameter outputting unit is regulated by coefficients, said evolutionary computing subunit programmed to on-line select and output fitted coefficients by the evolutionary computing, wherein the coefficients used in the control parameter outputting unit are replaced with the fitted coefficients to update the input-output relationship of the control parameter outputting unit.

13. The system according to claim 12, wherein the control parameter outputting unit comprises a neural network regulated by coupling coefficients.

14. The system according to claim 9, further comprising an evaluation unit programmed to generate selection signals for selecting the fitted values of the control parameters and to output the signals to the evolutionary computing unit, when receiving signals from the user in real-time response to the performance of the motor.

15. The system according to claim 9, wherein the primary output-controller is an acceleration pedal or grip, and the secondary output-controller is a throttle valve for an internal combustion engine or a running current controller for an electric motor.

* * * * *